(12) United States Patent
Sekar

(10) Patent No.: US 7,850,812 B2
(45) Date of Patent: Dec. 14, 2010

(54) METHODS FOR MANUFACTURING A PAINT ROLLER AND COMPONENT PARTS THEREOF

(76) Inventor: Chandra Sekar, 4 Sunset Rd. North, Searingtown, NY (US) 11507

( * ) Notice: Subject to any disclaimer, the term of this patent is extended or adjusted under 35 U.S.C. 154(b) by 0 days.

(21) Appl. No.: 12/350,798

(22) Filed: Jan. 8, 2009

(65) Prior Publication Data
US 2010/0170630 A1 Jul. 8, 2010

(51) Int. Cl.
| | |
|---|---|
| *B31C 1/00* | (2006.01) |
| *B65H 81/00* | (2006.01) |
| *B29C 53/78* | (2006.01) |
| *B29C 65/00* | (2006.01) |
| *B32B 37/00* | (2006.01) |
| *B32B 38/04* | (2006.01) |
| *B32B 27/00* | (2006.01) |
| *B44D 5/00* | (2006.01) |

(52) U.S. Cl. ............... 156/195; 156/184; 156/252; 156/334; 15/230.11
(58) Field of Classification Search .......... 156/184, 156/185, 187, 188, 190, 191, 192, 193, 195, 156/252; 15/230, 230.11; 492/13, 16, 17, 492/19, 48; 29/895.211
See application file for complete search history.

(56) References Cited

U.S. PATENT DOCUMENTS

| | | | |
|---|---|---|---|
| 6,159,134 A * | 12/2000 | Sekar ................. | 492/13 |
| 2002/0042331 A1* | 4/2002 | Fortner et al. ............ | 492/13 |
| 2002/0139228 A1* | 10/2002 | Johnston et al. .......... | 83/13 |
| 2008/0196821 A1* | 8/2008 | Hazantonis et al. ....... | 156/188 |

\* cited by examiner

*Primary Examiner*—Richard Crispino
*Assistant Examiner*—Brian R Slawski
(74) *Attorney, Agent, or Firm*—Greenberg Traurig LLP

(57) ABSTRACT

Described is a method of making a laminated paint roller wherein a perforated strip of thermoplastic material is advanced, the perforated strip having holes there-through. A lubricant is applied to the inner surface of the advancing perforated strip of thermoplastic material. The lubricated, perforated strip of thermoplastic material is helically wound around a cooled mandrel so as to form a helically wound strip wherein the inner surface of the perforated strip faces the cooled mandrel and the outer surface of the perforated strip faces away from the cooled mandrel. The wound perforated strip is advanced along the cooled mandrel. A layer of adhesive is applied onto an outer surface of the wound perforated strip. A strip of composite cover material is helically wrapped about the wound strip and over the layer of adhesive, the outer surface of the composite cover material comprising a pile fabric, and the inner surface of the composite cover material comprising thermoplastic. A compressive force is applied upon the composite cover material to urge the composite cover material, the layer of adhesive and strip of thermoplastic material together against the cooled mandrel, thereby laminating the inner surface of the composite cover material to the outer surface of the strip. A method of making a composite cover material is also disclosed.

6 Claims, 13 Drawing Sheets

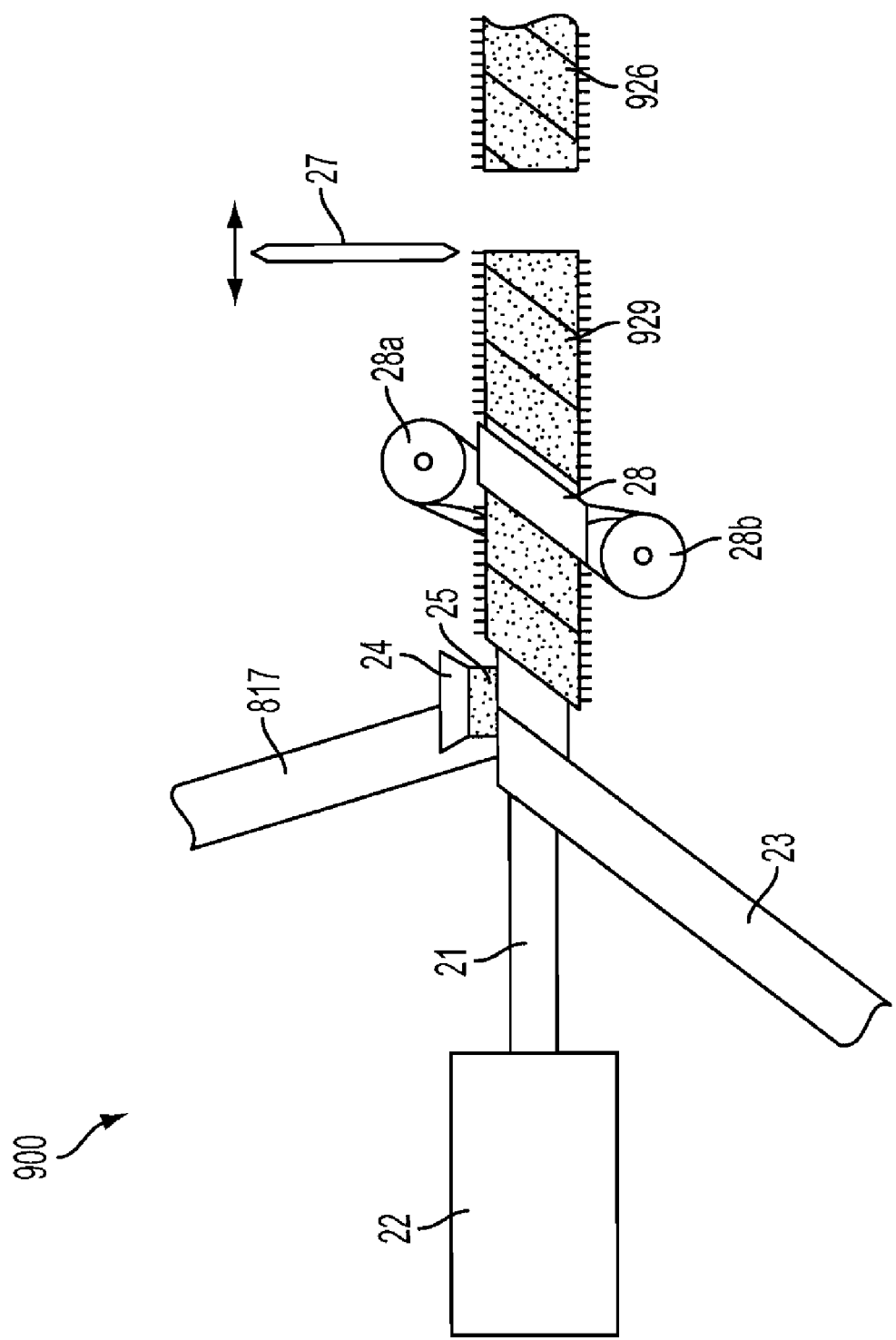

METHODS FOR MANUFACTURING A PAINT ROLLER AND COMPONENT PARTS THEREOF

This application includes material which is subject to copyright protection. The Copyright owner has no objection to the facsimile reproduction by anyone of the patent disclosure, as it appears in the Patent and Trademark Office files or records, but otherwise reserves all copyright rights whatsoever.

FIELD OF THE INVENTION

This invention pertains to a method and apparatus for making paint rollers of the type used for applying paint to walls and the like. More specifically, the invention pertains to a method and apparatus for making paint rollers that are formed in a continuous process from a strip and a composite cover material.

BACKGROUND OF THE INVENTION

Paint rollers are widely used by professionals and amateurs for applying paint to walls, ceilings, and other surfaces. Typically the roller is used with an applicator having a handle terminating in a rotatable member to which the roller is secured. The roller itself generally comprises a paint absorbing and spreading cover affixed to a generally cylindrical core. The covers may be made from materials such as wool or polyester, and other cover materials that are well known in the art.

Years ago paint rollers were manufactured using a paper or chipboard core. Some manufacturers still make such paper core paint rollers. The manufacture of such cores is well known. Such cores, however, and the paint rollers made out of them, would often fall apart during use or during cleaning, especially during cleaning with paint solvents (such as, for example, turpentine or mineral spirits, such paint solvents are well known in the art). It has always been desirable, and still remains desirable, to make the paint roller resistant to paint solvents.

An advance in making paint rollers came when the paper cores were replaced with phenolic cores, that is, cores made from paper impregnated with phenolic. Such paint rollers withstood exposure to paint solvents much better than their paper or chipboard counterparts. The process of manufacturing phenolic cores is also well known. For example, according to one known technique, a reusable disposable roller is made by first feeding three phenolic impregnated paper strips at an angle to a mandrel for overlapping, helical winding to form an endless core. Typically, the phenolic strips are supplied in rolls that can be mounted on spindles for continuous feeding, and a continuous thermosetting glue is applied to the outer surfaces of the strips as they feed off the rollers such that the strips adhere together as they are helically wound to form the core. As the endless core is belt driven down the line, the core is heated in a multi-stage infrared heater, after which a hot melt glue is applied to the core's outer surface and a continuous strip of the cover material, such as polyester, is helically wound on to the core where it is secured by the hot melt. All that remains is to cut the resulting endless roller down to usable sizes, which is usually accomplished in two steps, first using a fly away cutter to cut, e.g., 65 inch stock, and then using another cutter to cut the stock into usable lengths of, e.g., seven or nine inches.

The obvious drawback of reusable cores formed in this manner is that they require a long assembly line, due to the need of a heater, and because the phenolic must be heated to a predetermined temperature, there is an obvious trade off between the number of heater stages and the speed of the line. Additionally, while the resulting rollers are termed reusable because they do not separate when placed in paint solvents, any prolonged exposure to such solvents, does result in breakdown of the paint roller and/or separation of the layers. Moreover, the manufacturing process for making phenolic core rollers is environmentally unfriendly.

Another reusable roller is disclosed in U.S. Pat. No. 4,692,975 issued to Garcia, wherein the roller is formed using a preformed core made of thermoplastic (e.g. polypropylene) tubular stock. In particular, the process disclosed mounting a preformed core on a rotating spindle, providing a carriage movable in a direction parallel to the spindle, and providing on the carriage a direct heat source and, at an angle to the spindle a continuous strip of fabric. The disclosed process consisted of igniting the direct heat source to begin heating the outer surface of the tubular stock and moving the carriage parallel to the spindle in timed relation to the spindle's rotation so that the fabric strip is wound on the heated portion of the plastic core in a tight helix. The heated portion of the plastic core was thereby heat-softened just in advance of the point where the fabric strip is applied, such that the fabric is bonded to the core as it is wound thereon. In effect, a portion of the polypropylene core surface is used as the bonding adhesive. One advantage of the roller disclosed in the Garcia patent is that the bond formed between cover and core is a strong one not easily subject to separation from exposure to paint solvents. Another advantage is that the manufacturing process does not require the application of a separate adhesive to bond the cover to the core. There are, however, drawbacks. For one, while prior art techniques use rolls of, e.g., chipboard or paper, the Garcia process requires preformed thermoplastic tubular cores which are considerably bulkier than rolls, more expensive to transport, and more difficult to handle. Another drawback is the anticipated speed limit of the Garcia process dictated by the necessity that the heater, which advances along the core just in front of the fabric strip, move slow enough to insure softening of the polypropylene core, in the absence of which the fabric cover will not bond. In addition, the application of direct heat to the preformed polypropylene core presents manufacturing hazards from the heat source and from the fumes and/or chemicals released during the heating process.

U.S. Pat. No. 5,195,242, which is incorporated herein by reference in its entirety, issued to one of the present inventors and resolved many of the foregoing problems by (i) forming the thermoplastic core on the fly instead of using preformed cores, and (ii) using preheated thermoplastic as a glue, both to form the core by applying it between the strips forming the core, and to affix the cover to the core by applying it to the outside of the core before wrapping the cover thereabout. The patent describes a process involving the wrapping of three strips of thermoplastic material (preferably polypropylene) around a mandrel in overlapping relation to form a core, the strips making the core are bonded together by applying a liquefied thermoplastic material (again, preferably polypropylene) thereto prior to wrapping them about the mandrel. After the core is thus formed a liquefied thermoplastic (again, preferably polypropylene) is applied to the outer surface of the core, and a cover wrapped thereupon. All that remains, as is well known, is to cut the resulting endless roller down to usable sizes, which, as described above may be accomplished in two steps, first using a fly away cutter to make longer lengths, and then using another cutter to cut the stock into usable lengths. While this process was capable of making high quality rollers that were substantially unaffected by paint solvents, the process involved the use of multiple strips of thermoplastic material and numerous points of application for liquefied thermoplastic. As a result, the process was difficult to set up, and required many continuous adjustments in its operation.

U.S. Pat. No. 5,468,207 issued to Bower discloses a continuous process using direct heat to bond the surface of the thermoplastic plastic strips instead of applying liquefied thermoplastic to the strips to bond them together. Bower also discloses using direct heat to the surface of the core to bond the cover rather than applying liquefied thermoplastic prior to applying the cover.

U.S. Pat. No. 5,572,790, which is incorporated herein by reference in its entirety, also issued to one of the present inventors, and resolved some of the complexity problems of the foregoing process. Under this process, which has become a de facto standard for roller manufacturing today, instead of forming a core by winding a plurality of strips in overlapping relation about a mandrel, and then affixing a cover thereto, it was disclosed to wind only a single strip about the mandrel, the adjacent edges thereby placed in a closely-spaced or abutting relation. A liquefied thermoplastic material (preferably, polypropylene) is then applied to the exposed surface of the wound strip, and a roller is formed by helically winding the cover over the liquefied material and the wound strip with sufficient tensile force so that the fabric cover lays smoothly thereupon. Again, as with other endless roller manufacturing, a fly-away cutter may be first used to cut the product into longer lengths, and then such lengths may be cut to usable lengths. This process represented an advance over the previous method invented by the present inventor because the entire paint roller was formed in a single step which made the assembly line easier to manage as there was only a single strip of material and a single application of liquefied thermoplastic. The resulting roller, however, is somewhat inferior. More specifically, a defect present in all such rollers, manifests itself as a weak point, often sticking out from the ends of a cut roller, or making the ends of the cut roller appear "out of round." This results from the high tension memory of the strip which tends toward unwinding or toward "open" with high hoop strength. Moreover, to achieve the desirable hardened feel of the multi-layer rollers, the single strip rollers are generally made using a thicker plastic strip. The thicker the plastic strip used, (especially in relation to the diameter of the core) the more pronounced the memory effect appears on the roller.

U.S. Pat. No. 5,862,591 discloses another method of forming a paint roller in a single step. In this process, strips of thermoplastic are not used, and instead, a fluidized polypropylene is applied directly to a mandrel, and a cover is placed thereupon. The application of fluidized polypropylene to a mandrel has concomitant complications in synchronization and in the problems inherent in working with consistency of application of a fluidized layer in forming a polypropylene core. Like this process, other proposals have been made for placing the pile fabric on a heated core, as for example in French Patent Publication 2,093,060, in which pile fabric is placed on a hot, freshly extruded core. It is, however, believed that no such systems have the difficulties associated with controlling the shrinkage variation which inevitably occurs in the matching of what is essentially a through heated core blank or strip blank and a cold (i.e., room temperature, for example) pile fabric.

U.S. Pat. No. 6,159,134, which is incorporated herein by reference in its entirety, also issued to one of the present inventors, and represented an advance for making paint rollers having thermoplastic cores and a fully integrated cover that are formed in a single-step step continuous process from two polypropylene strips. Under this process, two strips of thermoplastic material are helically advanced about each other around a mandrel in an offset relation. Then, a cover is helically advanced about the second strip while providing an adhesive between the first strip and the second strip and between the outer surface of the strips and the cover. A continuous laminated paint roller is formed by applying a compressive force upon the cover.

U.S. patent application Ser. No. 12/200,734, also by the present inventor, which application is incorporated herein by this reference in its entirety, represented an advance for making paint rollers having thermoplastic cores and a fully integrated formed in a continuous process using one or more perforated strips.

U.S. patent application Ser. No. 12/147,472, in which the present inventor is a co-inventor, which application is incorporated herein by this reference in its entirety, represented an advance for making paint rollers having thermoplastic cores and a fully integrated cover formed in a continuous process from strips with grooves on a surface thereof.

SUMMARY OF THE INVENTION

In an embodiment, the invention includes a method of making a laminated paint roller wherein a perforated strip of thermoplastic material is advanced, the perforated strip having holes there-through. A lubricant is applied to the inner surface of the advancing perforated strip of thermoplastic material. The lubricated, perforated strip of thermoplastic material is helically wound around a cooled mandrel so as to form a helically wound strip wherein the inner surface of the perforated strip faces the cooled mandrel and the outer surface of the perforated strip faces away from the cooled mandrel. The wound perforated strip is advanced along the cooled mandrel. A layer of adhesive is applied onto an outer surface of the wound perforated strip. A strip of composite cover material is helically wrapped about the wound strip and over the layer of adhesive, the outer surface of the composite cover material comprising a pile fabric, and the inner surface of the composite cover material comprising thermoplastic. A compressive force is applied upon the composite cover material to urge the composite cover material, the layer of adhesive and strip of thermoplastic material together against the cooled mandrel, thereby laminating the inner surface of the composite cover material to the outer surface of the strip.

In another embodiment, the invention includes a method of making a composite cover material wherein a pile material is advanced. A first adhesive layer is applied to the underside of the pile material. A second adhesive layer is applied over the first adhesive layer, the second adhesive layer and the first adhesive layer being different adhesives. The first adhesive layer and the second adhesive layer are allowed to set. The pile on the pile side of the pile material is cut to the desired height. The composite sheet material is longitudinally cut to form one or more strips of composite cover material in a desired width, the outer surface of the composite cover material comprising a pile fabric, and the inner surface comprising thermoplastic.

The above and other objects, features and advantages of the embodiments will become more evident from the following discussion and drawings.

BRIEF DESCRIPTION OF THE DRAWINGS

In the accompanying drawings forming a part of this specification, and in which like reference characters are employed to designate like parts throughout the same:

FIG. 9A is a diagrammatic representation of an apparatus suitable for making laminated paint rollers using the composite cover material and a polypropylene strip for lamination;

DETAILED DESCRIPTION OF THE INVENTION AND THE PREFERRED EMBODIMENTS

Figure 1:
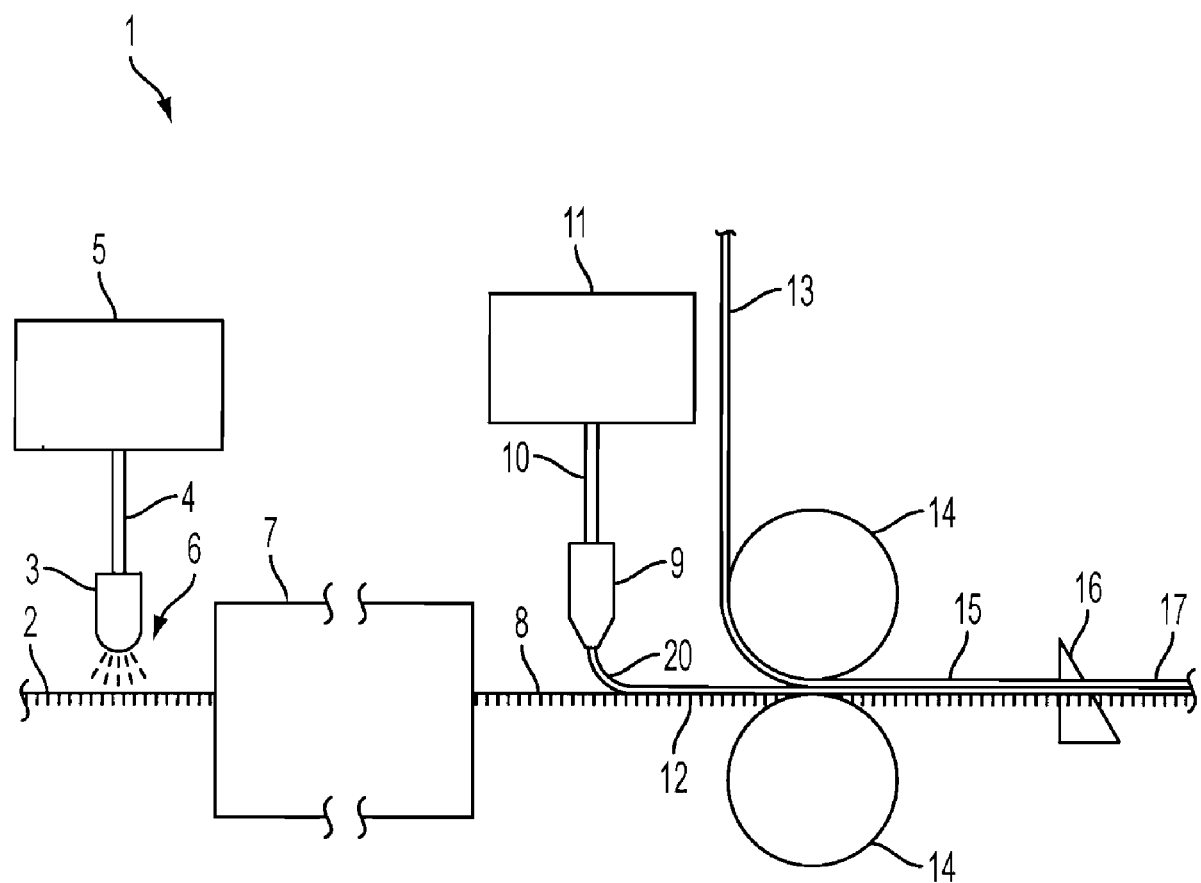
FIG. 1 is a side-view diagrammatic representation of portions of an apparatus suitable for forming the composite cover material.

In the embodiment shown in FIG. 1, an apparatus 1 for forming the composite cover material 17 is shown. In an embodiment, the apparatus comprises a first adhesive applicator 3, a first feeder 4, a first adhesive supply 5, an oven 7, a second adhesive applicator 9, a second feeder 10, a second adhesive supply 11, rollers 14 and cutters 16. The composite cover material is formed using a continuous supply of pile material 2 such as would be suitable for use manufacturing a paint roller cover. Suitable pile material 2 may be used such as the material that can be manufactured using a sliver knitting machine such as the SK-18 available from Mayer Industries Inc. Such knitted pile material may be made "in the round," and slit for use as a continuous pile material. Once slit, the knitted pile material can be laid flat for further processing. As an alternative to the knitted pile material, a woven pile material may be used, such a woven pile material, while generally more expensive than the knitted material, is advantageous as its fibers are locked in during the weaving process rather than by later application of an adhesive. The pile material 2 is usually sheared (not shown) on the pile side to attain a desired pile height. The material 2 can have any usable width, such as widths of approximately 32" or 60", and can be sheared to a desired pile height.

In an embodiment, the material 2 is laid flat using a tenter frame, and an adhesive layer 6 is applied thereto by the first adhesive applicator 3. The first adhesive supply 5 supplies the first adhesive to the applicator 3 by first feeder 4. In an embodiment, the first adhesive layer 6 is made predominantly or entirely from an emulsion in water of polyvinyl acetate. Such an emulsion is more commonly known as "white glue" and the yellow "carpenter's glue." In an embodiment, the first adhesive layer may, but need not, additionally contain a filler such as clay.

The material 2 with the first adhesive layer 6 is allowed to set and bond to the material 2 which helps the pile hold fast and form stiffened fabric 8. In an embodiment, setting of the first adhesive layer 6 can be hastened by passing the material 2 with the first adhesive layer 6 through an oven 7 such as an industrial oven to cause the first adhesive layer 6 to set and bond more quickly.

A second adhesive layer 20 is applied to the stiffened fabric 8 by the second adhesive applicator 9. The second adhesive supply 11 supplies the second adhesive to the applicator 9 by a feeder 10. In an embodiment, the second adhesive is made predominantly or entirely from polypropylene resin, the second adhesive applicator may be a die head and the supply 11 and feeder 10 are an extruder suitable for use to extrude polypropylene resin.

Before the second adhesive layer 20 can set, the stiffened fabric 12 with the second adhesive layer 20 thereon is fed, along with sheet material 13, between rollers 14 or other apparatus that can provide a compressing force to urge the stiffened fabric and the sheet material 13 towards the second adhesive layer 20 and each other. In an embodiment the sheet material 13 is made predominantly or entirely from polypropylene.

After being compressed by the rollers 14, combined sheet material 15 is advanced toward cutter 16 that is used to cut the sheet material 15 into composite cover material 17. In an embodiment, the composite cover material is approximately 2⅞ inches wide, corresponding to a width of cover material that may typically be used to manufacture paint rollers. In an embodiment, the composite cover material is spooled and cut into usable lengths that can be transported for use at another site or on another machine performing a continuous manufacturing process for laminated paint rollers.

In an embodiment, the sheet material has a thickness of between 0.010" and 0.030", although thinner and thicker sheet material is believed to be applicable, and the use of such thinner or thicker sheet material is within the contemplated scope of the present invention. When used with pile material 2 having a width of approximately 32", the width of the sheet material may be between about 31⅝" and 32". To manufacture eleven strips of composite cover material 17 that are 2⅞ inches wide, a width of at least 31⅝ inches is required, however, in an embodiment, using pile material 2 having a width of approximately 32", the width of the sheet material 13 should be between approximately 31⅞" and 32" to allow for a relatively small amount of waste on each side of the combined sheet material 15 as is cut by the cutter 16 and thereby becomes composite cover material 17.

While any width of pile material may be used, in an embodiment, a width of 60 inches is used to manufacture twenty strips of composite cover material 17 that are 2⅞ inches wide. In such an embodiment, the sheet material 13 is at least 57½" wide but preferably wide enough to allow for a relatively small amount of waste on each side of the combined sheet material 15 as is cut by the cutter 16 and thereby becomes composite cover material 17.

For ease of discussion in this application, the term "downstream" refers to the direction further along in the roller manufacturing process, or nearer the fly-away cutter 3, while the term "upstream" refers to the direction earlier in the roller manufacturing process, or further from the fly-away cutter 3.

Figure 2:
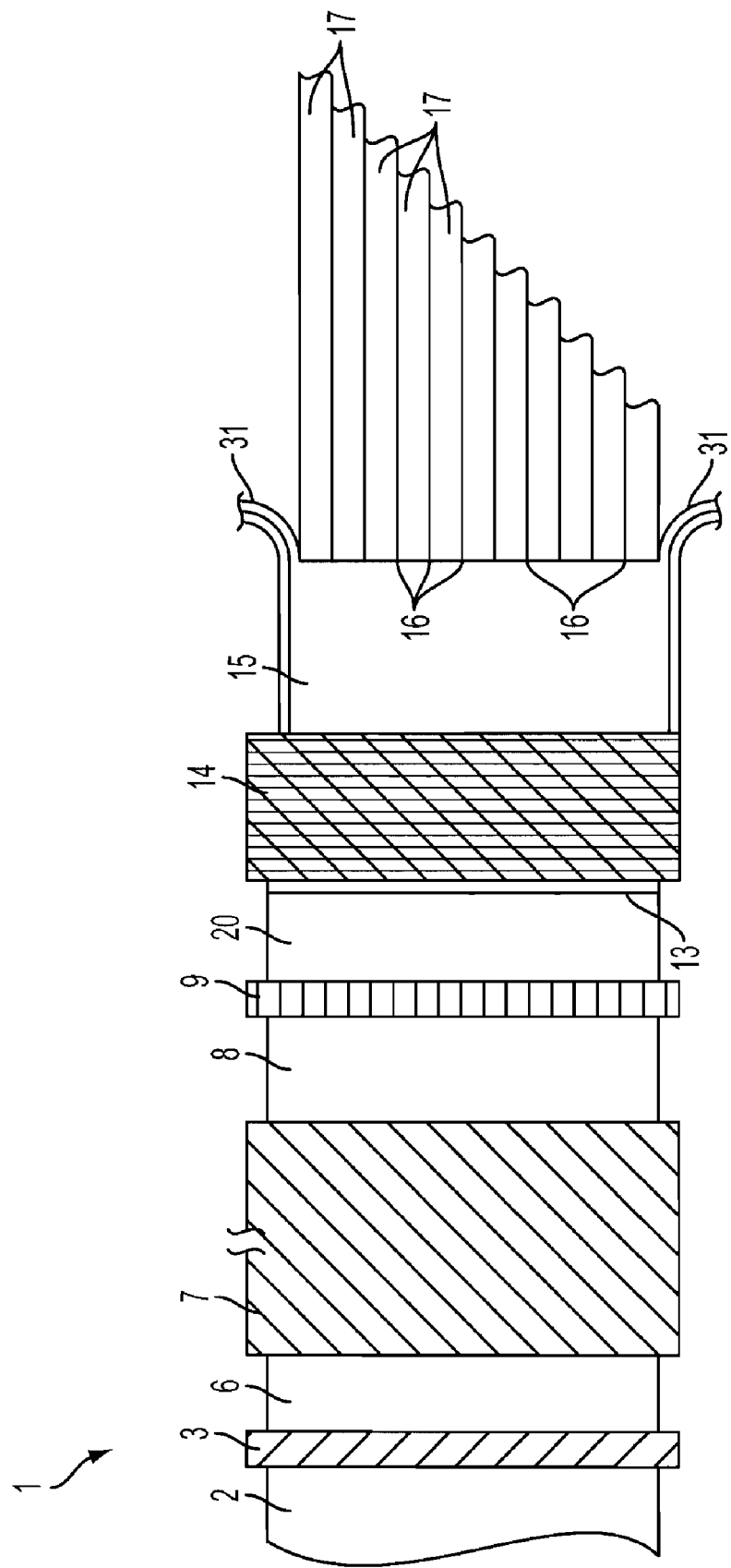
FIG. 2 is a top-view diagrammatic representation of an apparatus suitable for making rollers in accordance with the present invention.

Turning now to FIG. 2, a top view is shown of an apparatus for manufacturing the composite cover material 17 in accordance with an embodiment of the invention. The pile material 2 is fed to a first adhesive applicator 3 where a first adhesive layer 6 is applied to the non-pile surface of the material 2. The first adhesive layer 6 is allowed to set and bond to the material 2 which helps the pile hold fast and form stiffened fabric 8. The setting can, but need not be hastened by passing the material 2 with the first adhesive layer 6 through a heater 7 such as an industrial oven to cause the first adhesive layer 6 to set and bond more quickly.

In an embodiment, the stiffened fabric 8 can be spiral wound and cut into lengths of cover material and transported to another machine or location for further processing.

The second adhesive applicator 9 applies a second adhesive layer 20 to the stiffened fabric 8, either on the line in which it is manufactured, or from spools of the stiffened fabric 8. Before the second adhesive layer 20 can set, a sheet material 13 is applied and the stiffened fabric 8, the second adhesive layer 20 and the sheet material 13 are urged together. In an embodiment, this urging can be provided by a pair of rollers 14. In an embodiment each of the adhesive material 20 and the sheet material 13 are made predominantly or entirely from polypropylene.

Once the compressive force has been applied, and the second adhesive layer sets sufficiently, the combined sheet material 15 is advanced toward cutter 16 to form combine cover material 17.

In an embodiment the material 2 is approximately 32" wide, the sheet material 13 and adhesive layer 20 may be between 31⅝" and 32", and the composite cover material is 2⅞" wide. In such an embodiment, a dozen separate blades can be used in the cutter 16 to form eleven strips of 2⅞" each, and two small waste strips 31.

Varying the width of the material 2 is within the scope of the invention, thus, in another embodiment, the material 2 is approximately 32" wide, the sheet material 13 and adhesive layer 20 are between 31.675" and 32" wide, and the composite cover material is 2⅞" wide. In such an embodiment, 12 separate blades can be used in a cutter to form 11 strips of 2⅞" each, and two small waste strips.

In an embodiment, the strip material is wound into spools (not shown) and delivered to another site or apparatus where paint rollers can be formed in a laminate process.

Figure 3:
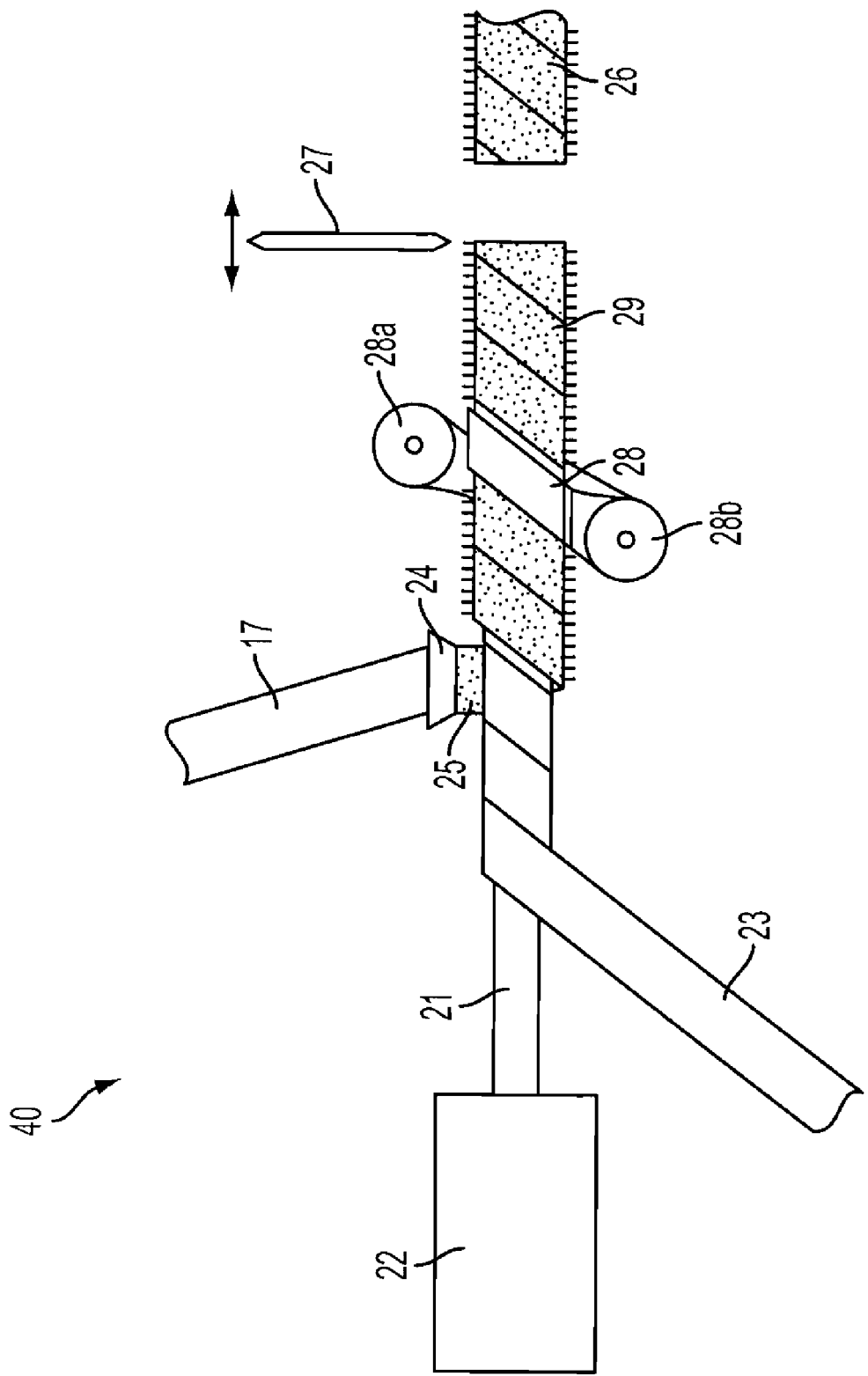
FIG. 3 is a side-view diagrammatic representation an apparatus suitable for making paint rollers using one strip material and a composite cover material in accordance with the present invention.

Turning now to FIG. 3, a diagrammatic representation of an apparatus 40 suitable for making laminated paint rollers in accordance with an embodiment of the invention is shown.

Housing 22 supports mandrel 21. As is known in the art, a cooler (not shown) can be used to cool the mandrel 21. In an embodiment, inner strip 23 is feed about a the mandrel 21, so it winds helically. The term helically as used herein means oriented about a mandrel 21 so as to permit the upstream edge of a given wind of a strip or cover material to be in closely-spaced or abutting relation with the downstream edge of the preceding wind of the strip. As is known in the art, a lubricant such as 5% mineral oil may be applied to the inner surface of the inner strip 23 prior to winding on the mandrel 21.

The head 24 provides a layer of adhesive material 25 from a source of such material (not shown), the adhesive material 25 is preferably polypropylene. The source of adhesive material 25 is preferably an extruder, but may be any source of adhesive material including a melter. The head 24 may be any type of head appropriate for providing adhesive material 25 from the source, such as a nozzle or a die. Where the source of the adhesive material 25 is an extruder, the head 24 is preferably a die.

In an embodiment a single head 24 supplies an adhesive layer 25 to the outer surface of inner strip 23 as it rotates around the mandrel 21. Although the width of the adhesive layer may be varied, in an embodiment, the width the adhesive layer 25 should substantially cover the outer surface of the inner strip 23. The width of the adhesive layer 25, however, may not completely cover the outer surface of the inner strip 23, or may be sufficient to excess adhesive over the amount required to completely cover the outer surface of inner strip 23. A strip of composite cover material 17 is advanced about the mandrel 21 outside of the inner strip 23 and adhesive layer 25. In an embodiment, composite cover material 17 comprises a pile material 2 bonded to a backing made of, or compatible with, polypropylene.

The edges of the composite cover material 17 may be offset from the edges of the inner strip 23 as the two are advanced along the mandrel 21. It is believed that the a stronger product is yielded from having an offset between the edge of the composite cover material 17 and the edge of the inner strip 23. An offset of between about one-quarter (as shown) and three-quarters of the width of the inner strip 23 is found to achieve acceptable results. The best results are presently believed to be achieved by having an offset of about one-half of the width of the inner strip 23.

Prior to the hardening and setting of the adhesive material 25, an inwardly compressive force applies pressure to the outer surface of the composite cover material 17, imparting inward forces on the component parts, thus laminating the composite cover material 17 and the inner strip 23 as the adhesive layer 25 sets. The continuous roller 29 is thereby formed about the mandrel 21.

In an embodiment, the inwardly compressive force is a helical belt system formed from rollers 28a, 28b, and a belt 28. In addition to compressing the component parts and forming the roller, the belt 28 advances the thus-formed endless roller 29 along the mandrel 21 and continuously rotates the endless roller, thereby also advancing the inner strip 23 and the composite cover material 17 around and downstream on the mandrel 21.

As is known in the art, the endless roller 29 may be cut by the fly-away saw 27, into lengths after it has sufficiently set. The fly-away saw 27 may be used to cut endless roller 29 into paint-roller sized lengths ready for finishing, or more typically into sticks 26 of a fixed length, such as 65", that may be further cut and finished into paint-rollers.

It is within the scope of the invention to apply the adhesive layer 25 to the outer surface of the inner strip 23, the inner surface of the composite cover material 17, or simultaneously to the inner surface of the composite cover material 17 and the outer surface of the inner strip 23, in any event, such that the adhesive layer 25 is sandwiched between the inner strip 23 and the composite cover material 17.

In an embodiment, the head 24 is a die head, and the adhesive layer 25 is made predominantly or entirely from thermoplastic. An extruder (not shown) forces the thermoplastic through the head 24, thereby applying liquefied thermoplastic as the adhesive layer 25. In an embodiment, the thermoplastic is predominantly, or entirely, polypropylene.

Although laminated paint rollers have previously been disclosed, such as in co-inventor Chandra Sekar's U.S. Pat. No. 6,159,134, the previous lamination processes involved the use of two separate strips of thermoplastic material and a separate cover material, along with a wider head capable of spanning approximately twice the width of the inner strip. The greater number of materials, larger head (and thus, larger associated pressure and flow rate) make this prior process for manufacturing laminated paint rollers substantially more complex than the simple single step, on-the-fly process of the present invention.

Although making paint rollers using a single strip and a cover in a single step on-the-fly process has previously been disclosed, such as in co-inventor Chandra Sekar's U.S. Pat. No. 5,572,790, that process, which at the time thought to represent an advance over previous methods for manufacturing paint rollers because the entire paint roller was formed in a single step which made the assembly line easier to manage as there was only a single strip of material and a single application of liquefied thermoplastic, the resulting roller was somewhat inferior. More specifically, a defect present in all such rollers manifests itself as a weak point, often sticking out from the ends of a cut roller, or making the ends of the cut roller appear "out of round." This results from the high tension memory of the single polypropylene strip which tends toward unwinding or toward "open" with high hoop strength. Thus, to achieve the desirable hardened feel of the multi-layer rollers, the single strip rollers would have to be made using a thicker plastic strip. The thicker the plastic strip used, (especially in relation to the diameter of the core) the more pronounced the memory effect appears on the roller.

In an embodiment: the inner strip 23 has a width of 2¾ inches, and a thickness of between about 0.010" and 0.030"; the composite cover material 17 has approximately the same thickness, not counting the pile height, and a width of 2⅞ inches; and the adhesive layer is between 0.010 inches and 0.030 inches. Thicknesses selected from the higher values in these ranges will provide paint rollers that have a more rigid feel, while thicknesses selected from the lower values in the ranges will provide a paint roller that has a softer feel. It is within the scope of the invention to independently select each of the thicknesses from these ranges. The width and thickness of the inner strip 23, and the width, non-pile thickness and pile thickness of the composite cover material 17 may be those that are appropriate for manufacture of the desired roller. For example, a typical high quality laminated roller having a 1.5-inch diameter core and a 75-wall can be manufactured with the following materials:

|  | Width | Non-pile Thickness | Pile Thickness |
| --- | --- | --- | --- |
| Inner Strip | 2.750" | 0.025" | N/A |
| Adhesive Layer | 2.750" | 0.025" | N/A |
| Composite cover material | 2.875" | 0.025" | Desired Pile |

As used herein, the term "wall" or "mil" means thickness in thousandths of an inch. Such widths and thickness and the methods of determining them are known in the art. It will be apparent to one of skill in the art that almost infinite variation is possible depending upon the characteristics of the desired roller.

It is presently believed that the lamination process of the present invention will produce acceptable high quality rollers using less thickness, such as, a the laminated rollers having a 1.5-inch diameter core, which can be manufactured with any of the following combinations of materials:

|  | Width | Non-pile Thickness | Pile Thickness |
| --- | --- | --- | --- |
| Inner Strip | 2.750" | 0.010" | N/A |
| Adhesive Layer | 2.750" | 0.010" | N/A |
| Composite cover material | 2.875" | 0.020" | Desired Pile | or

|  | Width | Non-pile Thickness | Pile Thickness |
| --- | --- | --- | --- |
| Inner Strip | 2.750" | 0.010" | N/A |
| Adhesive Layer | 2.750" | 0.020" | N/A |
| Composite cover material | 2.875" | 0.015" | Desired Pile | or

|  | Width | Non-pile Thickness | Pile Thickness |
| --- | --- | --- | --- |
| Inner Strip | 2.750" | 0.020" | N/A |
| Adhesive Layer | 2.750" | 0.010" | N/A |
| Composite cover material | 2.875" | 0.015" | Desired Pile |

Variations of this type with respect to the present invention will be apparent to one skilled in the art. The amount of adhesive, however, is expected to be less than typically required in a process bonding a thermoplastic strip to an ordinary paint roller cover, such as the process disclosed in co-inventor Chandra Sekar's U.S. Pat. Nos. 5,572,790 and 6,159,134. This is expected because, in this application, the adhesive layer bonds only the typically non-porous thermoplastic layers rather than the typically porous paint roller cover.

It is possible, without departing from the invention, to use more than one head to apply the second adhesive layer between the composite cover material 17 and the inner strip 23. Regardless of the width or number of heads, in order to produce a quality laminated continuous roller, pressure must be applied inwardly upon the composite cover material 17 before the layer of polypropylene is permitted to harden and set.

In another embodiment (not shown), the composite cover material 17 can be directly fed from the machine producing it (e.g., no. 1 as shown in FIG. 1) into a paint roller manufacturing apparatus (e.g., no. 40 as shown in FIG. 2) for making laminated paint rollers. Where the is done in a continuous process that combines the compositing of the second adhesive layer 20 and the sheet material 13, the speed of the process is likely to be far slower than the run rate of the apparatus shown in FIG. 2. It is within the scope of the invention to combine multiple composite cover material 17 strips, such as, for example, using a fly-away to cutter to cut the composite cover material 17 into fixed-length sections, and using a fastening means to attach the ends of such fixed-length sections as the composite cover material 17 is consumed by the manufacturing of paint rollers using a paint roller manufacturing apparatus 40 as shown in FIG. 2. In this manner, depending on the relative speed of the paint roller manufacturing apparatus 40, the machine producing the composite cover sheet 15, the manufactured width of composite cover sheet 15 and the desired width of composite cover material 17, multiple paint roller manufacturing apparatus 40 can be supplied from one machine 1 making composite cover material 17.

Figure 4A:
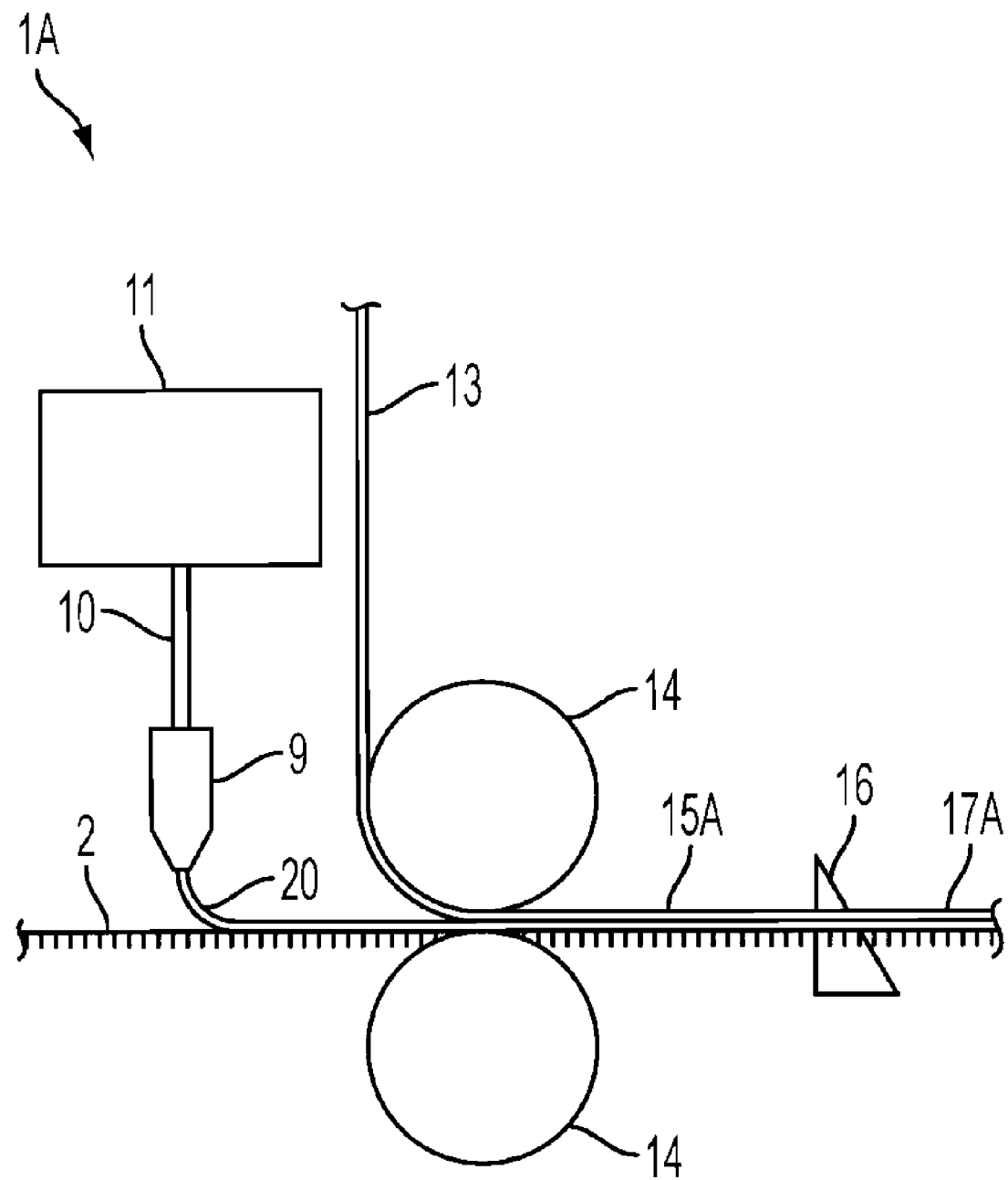
FIG. 4A is a diagrammatic representation of portions of another apparatus suitable for forming the composite cover material.

Turning now to FIG. 4A, an apparatus 1A for forming composite cover material 17A is shown. In an embodiment, the apparatus comprises an adhesive applicator 9, a feeder 10, an adhesive supply 11, rollers 14 and cutters 16. The composite cover material 17A is formed using a continuous supply of pile material 2 such as would be suitable for use manufacturing a paint roller cover. The pile material 2 can be laid flat for processing. It is usually sheared (not shown) on the pile side to attain a desired pile height prior to processing by the machine 1A. The material 2 can have any usable width, for example a width of approximately 32" is suitable.

In an embodiment, an adhesive layer 20 is applied to the non-pile side of the material 2 by the adhesive applicator 9. The adhesive supply 11 supplies the adhesive to the applicator 9 by a feeder 10. In an embodiment, the adhesive is made predominantly or entirely from polypropylene resin, the adhesive applicator may be a die head and the supply 11 and feeder 10 are an extruder suitable for use to extrude polypropylene resin.

Before the adhesive layer 20 can set, the fabric 2 with the adhesive layer 20 thereon is fed, along with sheet material 13, between rollers 14 or other apparatus that can provide a force to urge the fabric and the sheet material 13 and the adhesive layer 20 together. In an embodiment the sheet material 13 is made predominantly or entirely from polypropylene.

After being compressed by the rollers 14, combined sheet material 15A is advanced toward cutter 16 that is used to cut the sheet material 15A into composite cover material 17A. The rollers 14 may be cooled by a cooler (not shown) to hasten the setting of the adhesive layer 20, and thus hasten the forming of the combined sheet material. In an embodiment, the composite cover material 17A is approximately 2⅞ inches wide, corresponding to a width of cover material that may typically be used to manufacture paint rollers. The composite cover material 17A may be spooled and cut into usable lengths that can be transported for use at another site or on another machine performing a continuous manufacturing process for laminated paint rollers. In an embodiment, composite cover material 17A may be fed directly to an apparatus performing a manufacturing process for laminated paint rollers, such as feeding composite cover material 17A as composite cover material 17 to the apparatus 40 shown in FIG. 3.

In an embodiment, the sheet material 13 has a thickness of between 0.010" and 0.030", although thinner and thicker sheet material is believed to be applicable, and the use of such thinner or thicker sheet material is within the contemplated scope of the present invention. When used to manufacture eleven strips of composite cover material 17 that are 2⅞ inches wide, the pile material 2 should having a width of approximately 32", and the sheet material 13 should be between about 31⅝" and 32" wide. Increasing the width of the sheet material 13 to allow for a relatively small amount of waste on each side of the combined sheet material 15A as is cut by the cutter 16 and thereby becomes composite cover material 17A has been found to produce superior results.

Figure 4B:
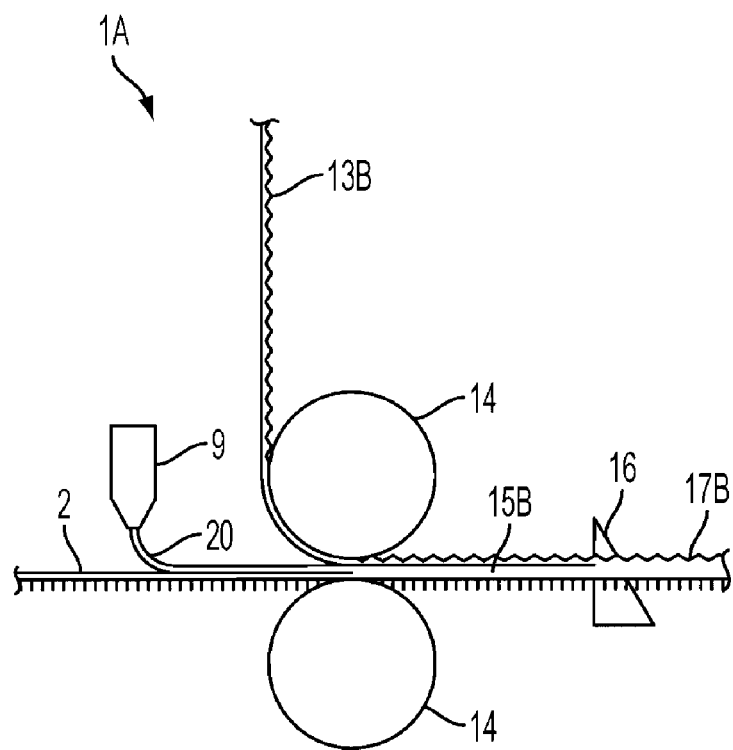
FIG. 4B is a diagrammatic detail of a portion of the side-view of the apparatus shown in FIG. 4A in an embodiment using a grooved sheet material to form the composite cover material.

Turning now to FIG. 4B, which shows a detail of a portion of the side-view of the apparatus 1A in FIG. 4A in an embodiment using a grooved sheet material 13B. A head 9 applies a layer of adhesive 20 to the material 2. The grooved sheet material 13 may be grooved on one or both sides, as discussed in U.S. patent application Ser. No. 12/147,472 to the instant inventors. In the embodiment shown, grooves are only on one side of the grooved sheet material 13B. The grooves are oriented so as to be exposed after the adhesive layer 20 sets, and the material 2 and the grooved sheet material 13B are integrated to form the grooved composite sheet material 15B. The composite sheet material 15B can be cut into the grooved composite cover material 17B by the cutter 16.

Figure 5:
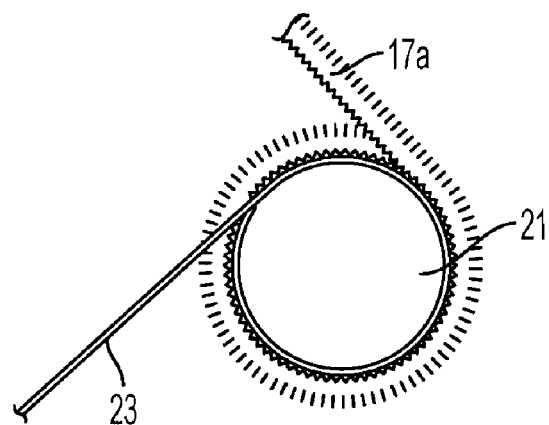
FIG. 5 is a diagrammatic cutaway view of the apparatus shown in FIG. 2 in an embodiment using grooved composite cover material.

Turning to FIG. 5, there is a cutaway view of the apparatus 40 shown in FIG. 3 in an embodiment using grooved composite cover material 17a. The inner strip 23 is fed around mandrel 21. The grooved composite cover material 17a is applied over an application of an adhesive layer (not shown). It is believed that as the grooved composite cover material 17a is helically wound, the grooves become smaller, and the adhesive of the adhesive layer occupies all or substantially all of the remaining space of the groove. Before the adhesive layer (not shown) can set, a compressive force is applied (e.g., by a belt, also not shown) causing the grooved composite cover material 17a to laminate around the inner strip 23. To the extent that the grooves are not occupied by the adhesive of the adhesive layer before the compressive force is applied, it is believed that the compressive force also urges the adhesive of the adhesive layer further into the grooves.

Figure 6:
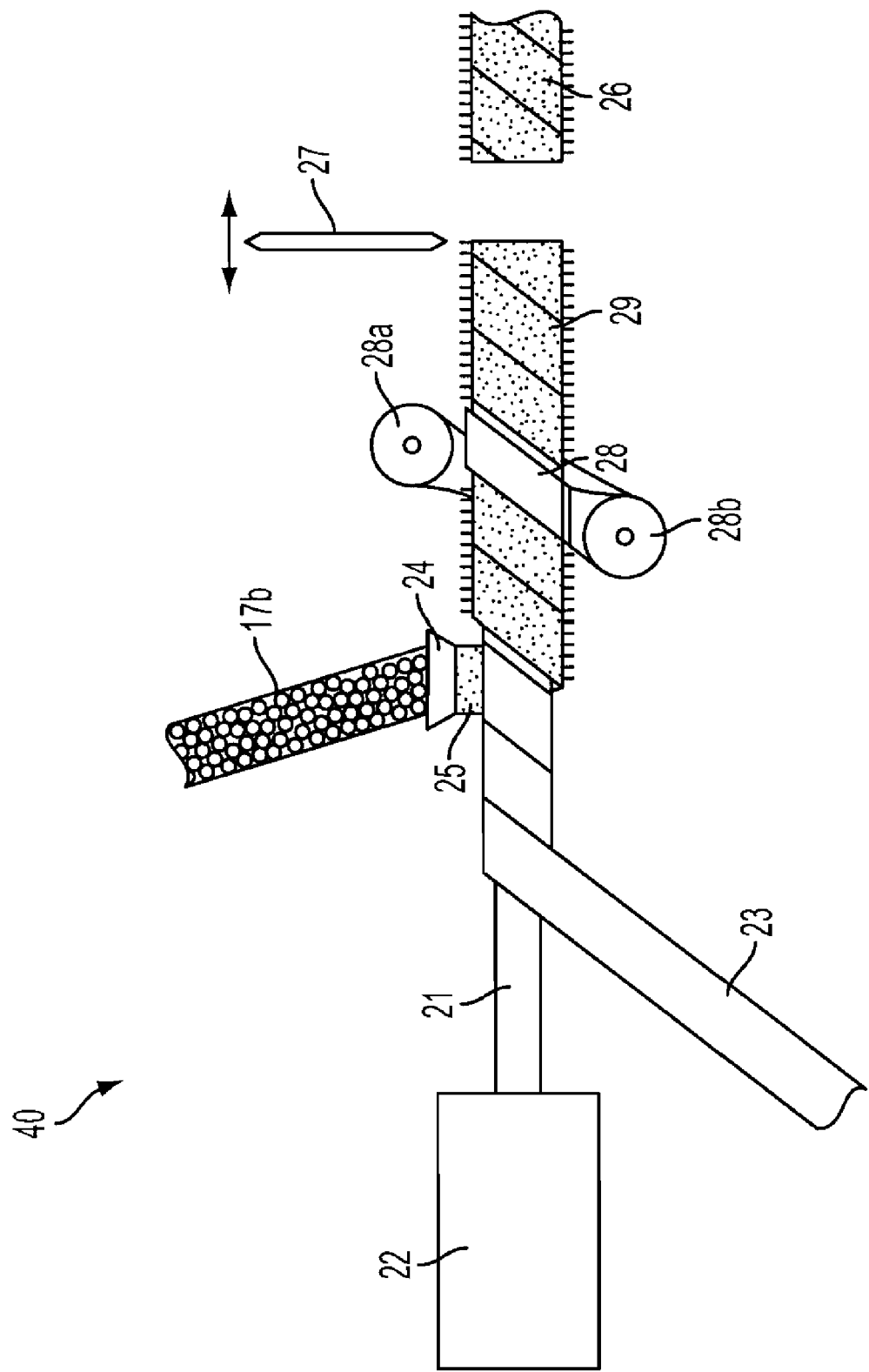
FIG. 6 is a diagrammatic representation of an apparatus suitable for making laminated paint rollers in accordance with an embodiment of the invention.

FIG. 6 shows a diagrammatic representation of an apparatus 40 suitable for making laminated paint rollers in accordance with an embodiment of the invention. The strip of composite cover material 17b differs from the composite cover material 17 shown in FIG. 1 because the sheet material (not shown) used to make the composite cover material 17b was perforated prior to being brought into contact with the second adhesive layer (20, FIG. 1). A purpose of the perforation is to use a lower weight of sheet material because sheet material such as polypropylene sheet material as may be advantageously used in connection with the present invention is generally sold by weight. Accordingly, the perforations may take on varying sizes and shapes as is appropriate to reduce material weight without adversely affecting the usability of the paint roller manufactured therewith. A discussion of various sizes and shapes of perforations that can be used in strip material is presented in U.S. patent application Ser. No. 12/200,734, which has been incorporated herein.

In an embodiment, a rotary die can be used to perforate the thermoplastic sheet material during for the process of making composite cover material. Alternatively, sheet material can be perforated in a separate process prior to manufacture of the composite cover material, or it can be purchased pre-perforated.

Figure 7:
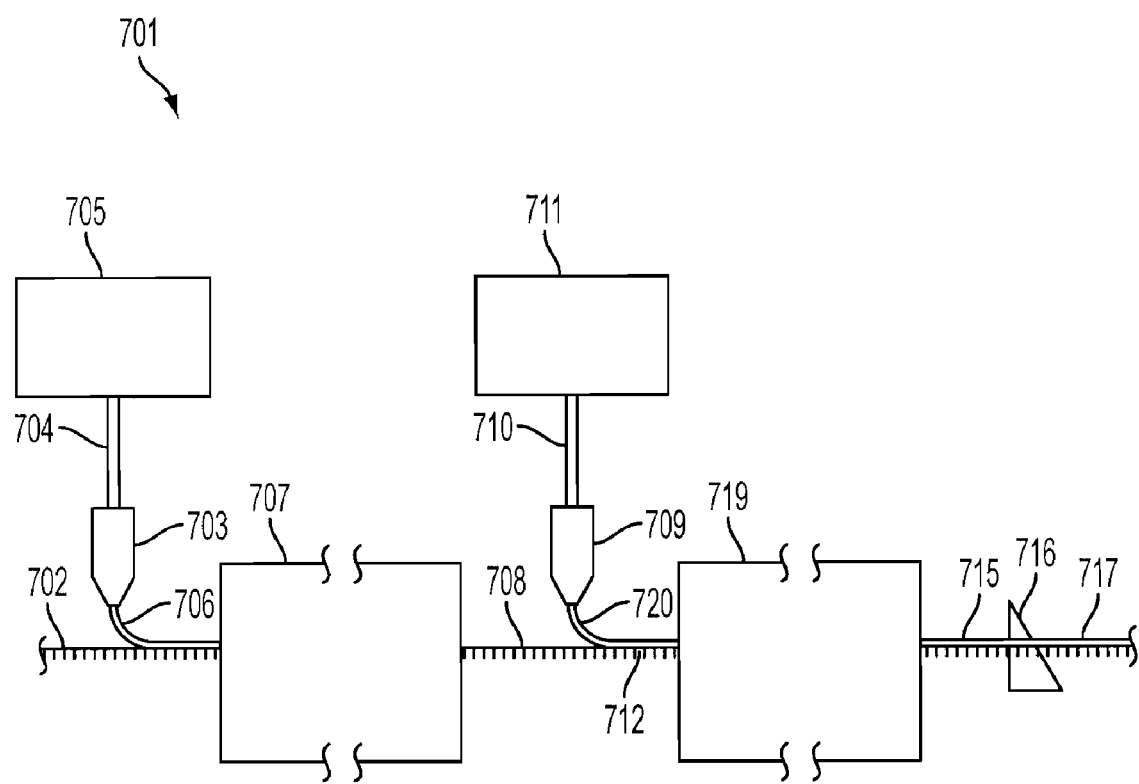
FIG. 7 is a side-view diagrammatic representation of portions of an apparatus suitable for forming the composite cover material.

Turning now to FIG. 7, an apparatus 701 for forming the composite cover material 717 is shown. In an embodiment, the apparatus comprises a first adhesive applicator 703, a first feeder 704, a first adhesive supply 705, a first heater 707, a second adhesive applicator 709, a second feeder 710, a second adhesive supply 711, a second heater 719, pile cutter 718 and strip cutter 716. The composite cover material is formed using a continuous supply of pile material 702 such as would be suitable for use manufacturing a paint roller cover. The material 702 can have any usable width, for example, a width of approximately 32" or 60".

In an embodiment, the material 702 is laid flat. A tenter frame may be used for this purpose. An adhesive layer 706 may be applied thereto by the first adhesive applicator 703.

The first adhesive supply 705 supplies the first adhesive to the applicator 703 by first feeder 704. In an embodiment, the first adhesive layer 706 is made predominantly or entirely from an emulsion in water of polyvinyl acetate. Such an emulsion is more commonly known as "white glue" and the yellow "carpenter's glue."

The first adhesive layer 706 may be allowed to set and bond to the material 702 which helps the pile hold fast and form stiffened fabric 708 before the application of the second adhesive layer 720, or may only be permitted to partially set prior to such application. In an embodiment, setting of the first adhesive layer 706 and its bonding to the material 702 can be hastened by passing the material 702 with the first adhesive layer 706 through the first heater 707 such as an industrial oven set to an appropriate temperature for setting the adhesive, but not so hot as to melt the material 702.

The second adhesive layer 720 is applied to the stiffened fabric 708 by the second adhesive applicator 709. The second adhesive supply 711 supplies the second adhesive to the applicator 709 by a feeder 710. In an embodiment, the second adhesive is made predominantly or entirely from polypropylene resin, the second adhesive applicator may be a die head and the supply 711 and feeder 710 are parts of an extruder suitable for use to extrude polypropylene resin.

The stiffened material 708 with the second adhesive layer 720 thereon is allowed to set and bond. In an embodiment, the combination 712 of the stiffened fabric 708 with the second adhesive layer 720 thereon is fed through the second heater 719 to form the composite sheet material 715. The second heater 719 may better integrate the second adhesive layer 720 and the stiffened fabric 708. The application of heat may even or smooth the exposed surface of the adhesive layer 720, and may permit the adhesive in the adhesive layer 720 to fill interstitial spaces or gaps within the stiffened material 708.

The composite sheet material 715 is advanced over cutter 716 to form composite cover material 717. As discussed above, the cutter 716 may be used to cut the composite sheet material 715 into strips of composite cover material 717 in a desired width. It is not necessary that all of the strips of composite sheet material 715 are cut into equal widths. It is within the scope of this invention to cut differing width composite cover material 717 from a single composite sheet material 715, for example, by varying the spacing of the cutting edges of the cutter 716.

In an embodiment (not shown) cooling may be applied to the composite sheet material 715, or to the composite cover material 717, to hasten the setting of the second adhesive layer 720.

In an embodiment, the composite cover material is approximately 2⅞ inches wide, corresponding to a width of cover material that may typically be used to manufacture paint rollers. The composite cover material 717 may be spooled and cut such that it can be transported for use at another site or on another machine performing a continuous manufacturing process for laminated paint rollers.

The pile of stiffened fabric 708 may be cut to a desired size by a pile cutter 718. The pile may be cut before or after the application of the first adhesive layer 706, and before or after the application of the second adhesive layer 720, but is preferably cut before the longitudinal cutter 716 is used to cut the composite sheet material 715 into composite cover material 717.

Figure 8A:
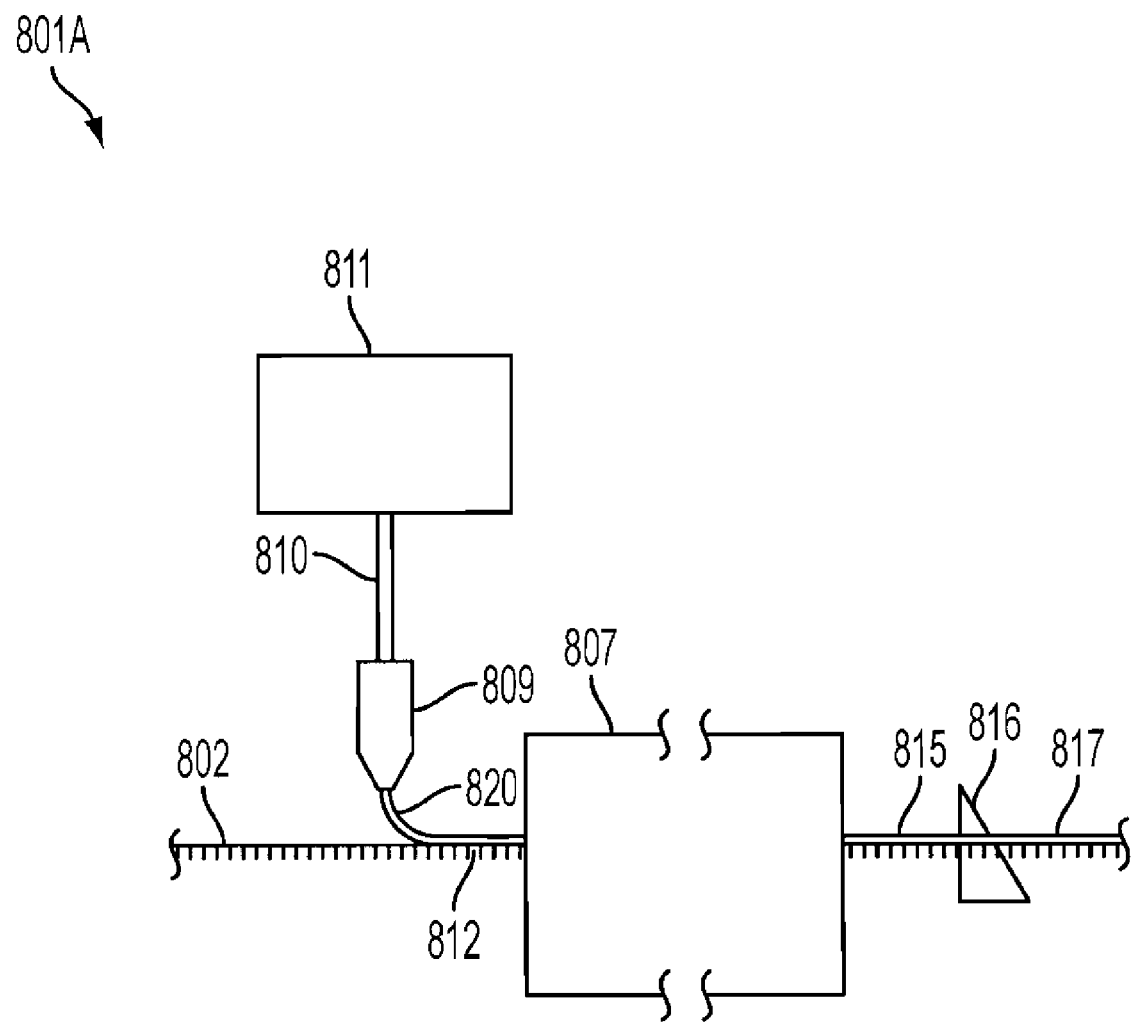
FIG. 8A is a side-view diagrammatic representation of portions of an apparatus suitable for forming the composite cover material.

Turning now to FIG. 8A, an apparatus 801A for forming the composite cover material 817 is shown. In an embodiment, the apparatus comprises an adhesive applicator 809, a feeder 810, an adhesive supply 811, an environmental control 807 and strip cutter 816.

The composite cover material 817 is formed using a supply of pile material 802 such as would be suitable for use manufacturing a paint roller cover. Pile material 802 is a type suitable for use as a paint roller, and in an embodiment may be knitted or woven material. The material 802 can have any usable width, for example, a width of approximately 32" or 60".

The material 802 is laid flat, in an embodiment, a tenter frame (not shown) can be used for this purpose. An adhesive layer 820 is applied to the fabric by the adhesive applicator 809. The adhesive supply 811 supplies the adhesive to the applicator 809 via a feeder 810. In an embodiment, the adhesive is made predominantly or entirely from polypropylene resin, the adhesive applicator 809 may be a die head and the supply 811 and feeder 810 are parts of an extruder suitable for use to extrude polypropylene resin.

The setting of the adhesive layer and/or the bonding between the adhesive layer 820 and the material 802 may be affected by control of the environment (e.g., the application of heating or cooling) after the adhesive 820 is dispensed from the applicator 809 but before it has set fully. It is within the scope of the invention to permit the setting of the adhesive layer 820 and its bonding to the material 802 naturally, or through the use of environmental intervention.

In an embodiment, after the application of the adhesive layer 820 the material 812 can be optionally fed through an environmental control 807 to form the composite sheet material 815. The environmental control 807 may be used to affect the bond between the adhesive layer 820 to the underlying material 802, and aid in integrating the adhesive layer 820 with the material 802. In an embodiment using an environmental control 807, the control 807 may employ the application of heat, which may even or smooth the exposed surface of the adhesive layer 820, and may permit the adhesive in the adhesive layer 820 to better fill interstitial spaces or gaps within the material 802. In another embodiment using an environmental control 807, the control 807 may employ cooling, such cooling can hasten the hardening or setting of the adhesive layer 820. It is within the scope of the invention to employ an environmental control 807 that utilizes the application of heat and the application of cold, seriatim, which may achieve, among other things, one or more of the following: (i) even or smooth the exposed surface of the adhesive layer 820; (ii) permit the adhesive in the adhesive layer 820 to better fill interstitial spaces or gaps within the material 802; and/or (iii) hasten the hardening or setting of the adhesive layer 820.

Whether or not an environmental control 807 is employed, the composite sheet material 815 is advanced across cutter 816 to form composite cover material 817. As discussed above, the cutter 816 may be used to cut the composite sheet material 815 into strips of composite cover material 817 in a desired width. The strips of composite sheet material 815 do not need to be cut to equal widths. It is within the scope of this invention to cut differing width composite cover material 817 from a single composite sheet material 815, for example, by varying the spacing of the cutting edges of the cutter 816.

In an embodiment, the strips of composite cover material 817 each have a width of approximately 2⅞ inches, corresponding to a width of cover material that may typically be used to manufacture paint rollers. The composite cover material 817 may be spooled and cut such that it can be transported for use at another site or on another machine performing a continuous manufacturing process for laminated paint rollers. In another embodiment, the composite cover material may be feed directly to an apparatus that uses the material in forming laminated paint rollers. Where the composite cover material is spooled, it may be desirable to spool the composite cover material 817 while it is still warm and pliable, alternatively, it may be desirable to ensure that the composite cover material 817 is fully cooled (i.e., not warm and pliable) when it is spooled.

If the pile on material 802 has not been sheared to the desired height prior to the application of the adhesive layer 820, it may be cut by a pile cutter (not shown) after application of the layer 820.

Figure 8C:
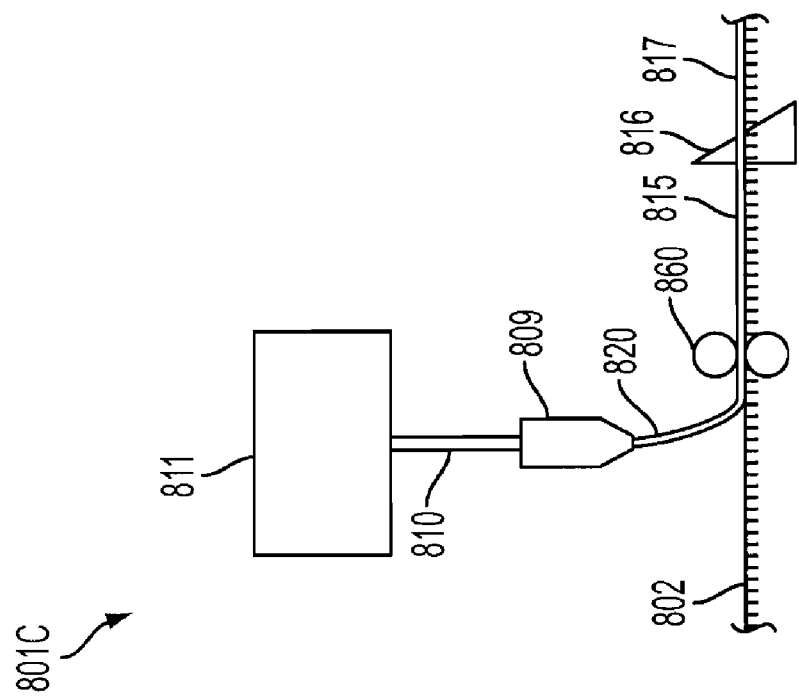
FIG. 8C is a side-view diagrammatic representation of portions of yet another apparatus suitable for forming the composite cover material.
Figure 8B:
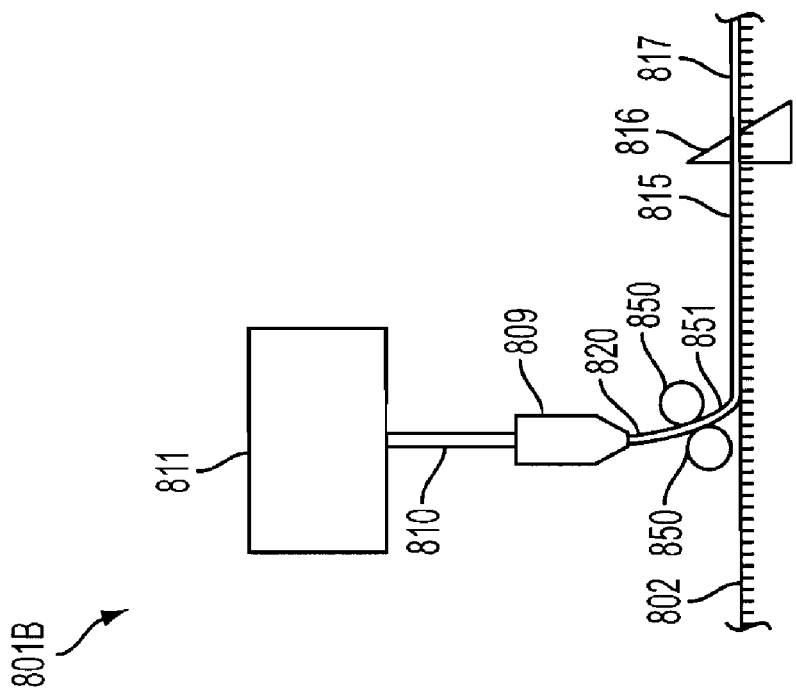
FIG. 8B is a side-view diagrammatic representation of portions of another apparatus suitable for forming the composite cover material.

Turning now to FIG. 8B, an apparatus 801B for forming the composite cover material 817 is shown. In an embodiment, the apparatus comprises an adhesive applicator 809, a feeder 810, an adhesive supply 811, cooling rollers 850 and strip cutter 816. After the adhesive layer 820 leaves the applicator 809, but before it contacts the material 802, the cooling rollers 850 cool and smooth the adhesive layer 820 to form a smoothed adhesive layer 851. In an embodiment where the adhesive is polypropylene, although smoothed adhesive layer 851 is cooler than it was in its molten form leaving applicator 809, it is still not hardened or set. Thus, after the smoothed adhesive layer 851 contacts the material 802, it can harden and set forming the composite sheet material 815. The composite sheet material 815 may be cut by cutter 816 to form the composite cover material 817.

Turning now to FIG. 8C, an apparatus 801B for forming the composite cover material 817 is shown. In an embodiment, the apparatus comprises an adhesive applicator 809, a feeder 810, an adhesive supply 811, cooling rollers 860 and strip cutter 816. After the adhesive layer 820 leaves the applicator 809 and contacts the material 802, the cooling rollers 860 that are lower in temperature than the adhesive layer 820 apply a compressive force compressing the adhesive layer 820 and the material 802 together to form the composite sheet material. The composite sheet material 815 may be cut by cutter 816 to form the composite cover material 817.

Figure 8E:
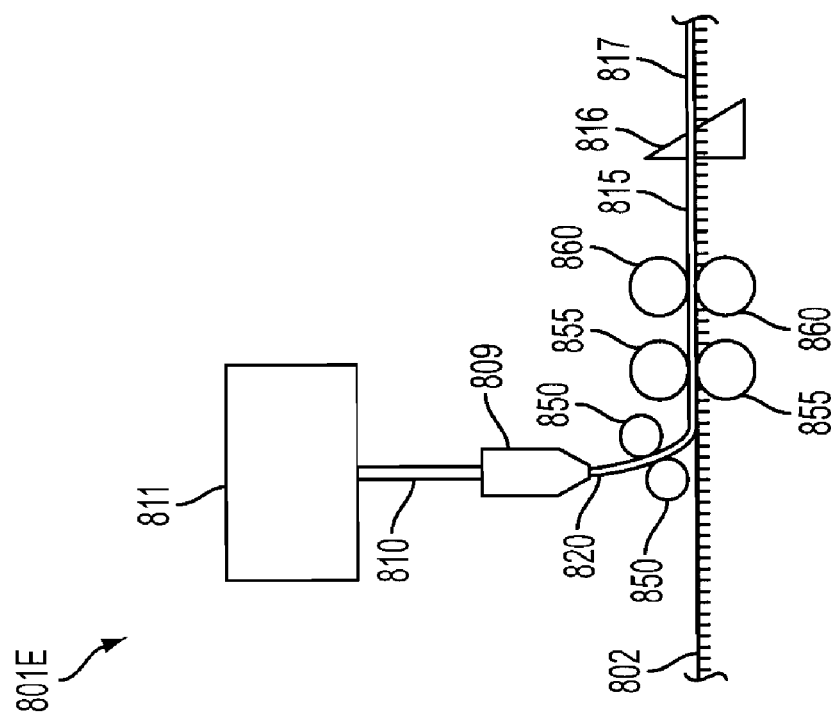
FIG. 8E is a side-view diagrammatic representation of portions of a further apparatus suitable for forming the composite cover material.
Figure 8D:
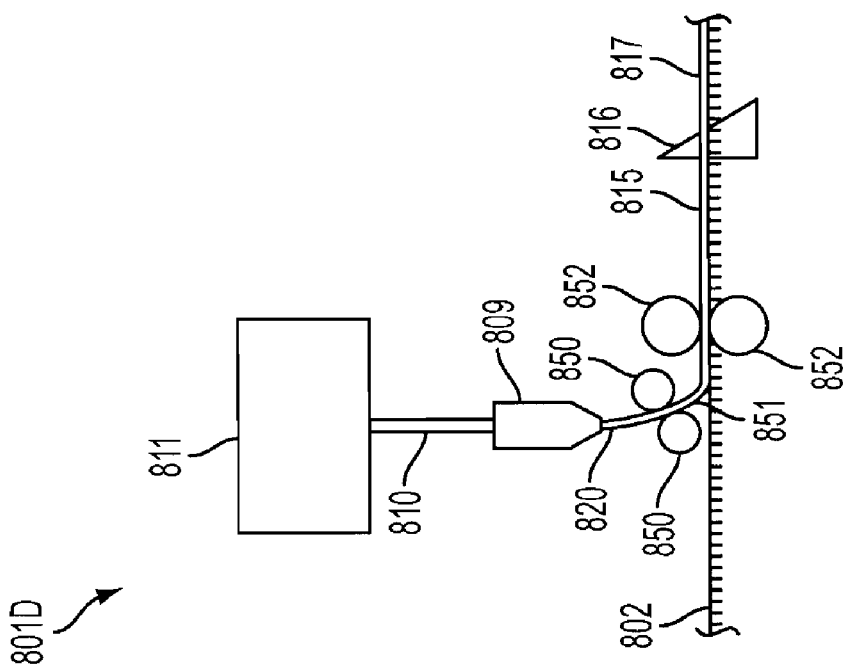
FIG. 8D is a side-view diagrammatic representation of portions of still another apparatus suitable for forming the composite cover material.

Turning now to FIG. 8D, an apparatus 801D for forming the composite cover material 817 is shown. In an embodiment, the apparatus comprises an adhesive applicator 809, a feeder 810, an adhesive supply 811, cooling rollers 850, rollers 852 and strip cutter 816. After the adhesive layer 820 leaves the applicator 809, but before it contacts the material 802, the cooling rollers 850 cool and smooth the adhesive layer 820 to form a smoothed adhesive layer 851. In an embodiment where the adhesive is polypropylene, although smoothed adhesive layer 851 is cooler than it was in its molten form leaving applicator 809, it is still not hardened or set. After the smoothed adhesive layer 851 contacts the material 802, the rollers 852 apply a compressive force compressing the smoothed adhesive layer 851 and the material 802 together to form the composite sheet material. The composite sheet material 815 may be cut by cutter 816 to form the composite cover material 817.

In an embodiment, the rollers 852 are heated to a temperature hotter than the temperature of smoothed adhesive layer 851. In an embodiment, the rollers 852 are cooled to a temperature cooler than the temperature of the smoothed adhesive layer 851. In an embodiment, the rollers 852 are neither heated nor cooled.

Turning now to FIG. 8E, an apparatus 801E for forming the composite cover material 817 is shown. In an embodiment, the apparatus comprises an adhesive applicator 809, a feeder 810, an adhesive supply 811, cooling rollers 850, heating rollers 855, second cooling rollers 860 and strip cutter 816. After the adhesive layer 820 leaves the applicator 809, but before it contacts the material 802, the cooling rollers 850 cool and smooth the adhesive layer 820 to form a smoothed adhesive layer 851. In an embodiment where the adhesive is polypropylene, although smoothed adhesive layer 851 is cooler than it was in its molten form leaving applicator 809, it is still not hardened or set. After the smoothed adhesive layer 851 contacts the material 802, the heating rollers 852 apply a compressive force compressing the smoothed adhesive layer 851 and the material 802 together while at the same time imparting heat to the combination. The second cooling rollers 860 thereafter apply a compressive force compressing the smoothed adhesive layer 851 and the material 802 together, while at the same time cooling them. It is believed that the heating by rollers 852 may aid in filling fill interstitial spaces or gaps within the material 802 with contacting side of the smoothed adhesive layer 851, and that the cooling by the second cooling rollers 860 may hasten the setting of the smoothed adhesive layer. The resulting composite sheet material 815 may be cut by cutter 816 to form the composite cover material 817.

Turning now to FIG. 9A, a diagrammatic representation is shown of an apparatus 900 suitable for making laminated paint rollers in accordance with an embodiment of the invention. The apparatus 900 and process of using the apparatus 900 are similar to the apparatus 40 (FIG. 2) and its processes. Housing 22 supports mandrel 21. The head 24 provides a layer of adhesive material 25 from a source of such material (not shown), the adhesive material 25 is preferably polypropylene. The source of adhesive material 25 is preferably an extruder, but may be any source of adhesive material including, e.g., a melter. The head 24 may be any type of head appropriate for providing adhesive material 25 from the source, such as a nozzle or a die, however, where the source of the adhesive material 25 is an extruder, the head 24 is preferably a die. As is known in the art, a cooler (not shown) can be used to cool the mandrel 21. As is also known in the art, a lubricant such as 5% mineral oil may be applied to the inner surface of the inner strip 23 prior to winding on the mandrel 21.

In an embodiment a single head 24 supplies an adhesive layer 25 to the outer surface of inner strip 23 as it rotates around the mandrel 21. Although the width of the adhesive layer may be varied, in an embodiment, the width the adhesive layer 25 should substantially cover the outer surface of the inner strip 23. The width of the adhesive layer 25, however, may not completely cover the outer surface of the inner strip 23, or may be sufficient to provide excess adhesive over the amount required to completely cover the outer surface of inner strip 23. A strip of composite cover material 817 (see, e.g., FIG. 8) is advanced about the mandrel 21 outside of the inner strip 23 and adhesive layer 25. Composite cover material 817 comprises a pile material 802 bonded to a backing made of, or compatible with, polypropylene.

The edges of the composite cover material 817 may be offset from the edges of the inner strip 23 as the two are advanced along the mandrel 21. It is believed that the a stronger product is yielded from having an offset between the edge of the composite cover material 17 and the edge of the inner strip 23. An offset of between about one-quarter and three-quarters of the width of the inner strip 23 is found to achieve acceptable results. The best results are presently believed to be achieved by having an offset of about one-half (as shown) of the width of the inner strip 23.

Prior to the hardening and setting of the adhesive material 25, a compressive force applies pressure to the outer surface of the composite cover material 817, imparting inward forces on the component parts, and laminating the composite cover material 817 and the inner strip 23 as the adhesive layer 25 sets. The continuous roller 929 is thereby formed about the mandrel 21. The continuous roller 929 can be cut to usable lengths 926 by fly-away saw 27.

Figure 9B:
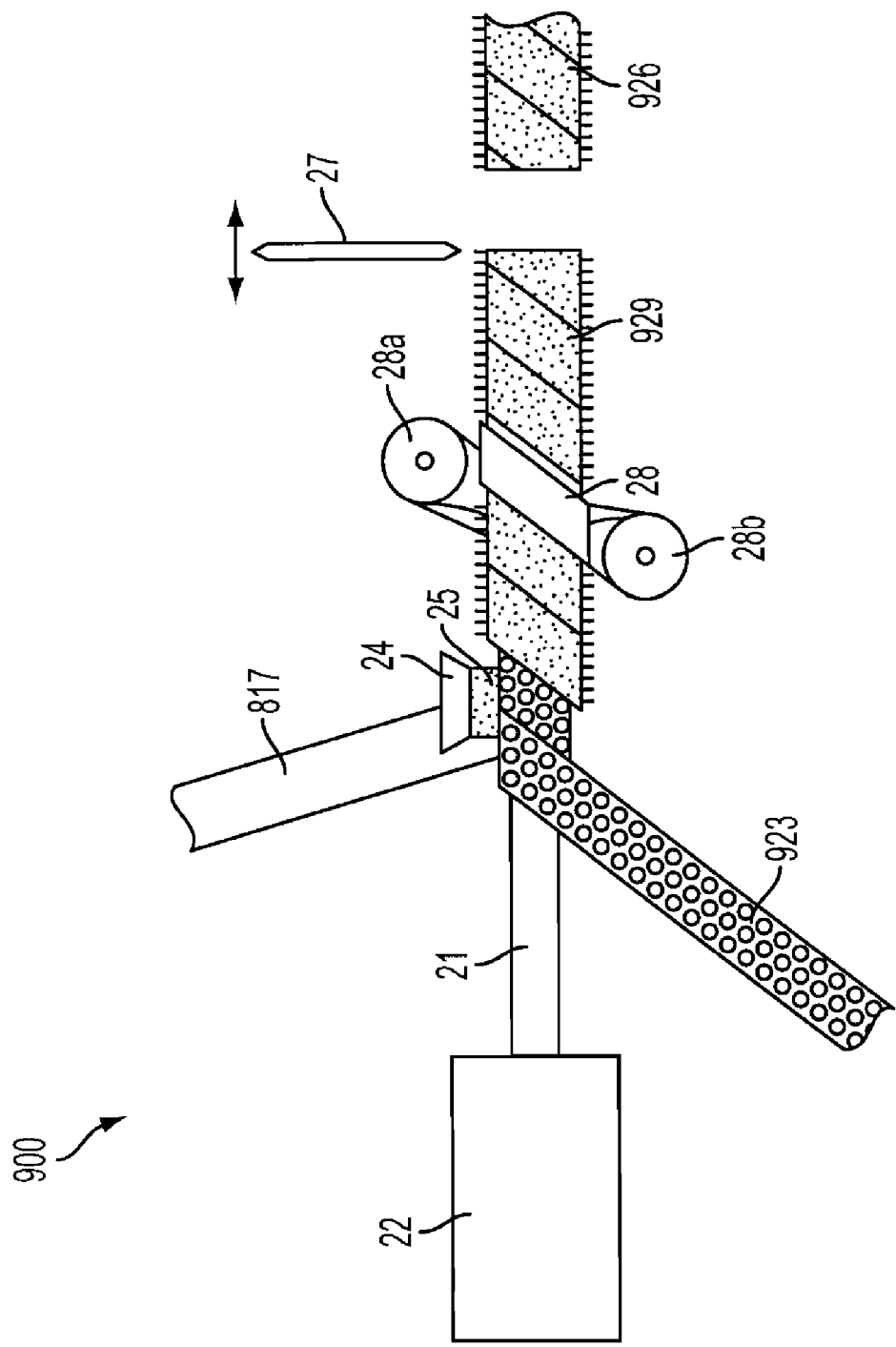
FIG. 9B is a diagrammatic representation of an apparatus suitable for making laminated paint rollers using the composite cover material and a perforated polypropylene strip for lamination.

Turning now to FIG. 9B, a diagrammatic representation is shown of an apparatus 900 suitable for making laminated paint rollers in accordance with an embodiment of the invention. The apparatus 900 is the same as shown in FIG. 9A, and the process of using the apparatus is similar to the process described in connection with FIG. 9A, except in the use of a perforated inner strip 923. Co-pending U.S. patent application Ser. No. 12/200,734, also by the present inventor, contains a discussion of the possible variations in perforation, all of which may be used within the scope of the invention herein.

Although many variations are possible, in an embodiment using a perforated inner strip 923 made predominantly or entirely from polypropylene, the inventor has found that generally round, relatively small perforations, such as perforations of approximately ⅛ inch perform adequately to permit the prevent the adhesive layer 25 from having excessive contact with, or imparting excessive heat to, the mandrel 21. As is known in the art, a cooler (not shown) can be used to cool the mandrel 21, and in the described embodiment such a cooler may assist in preventing the adhesive layer 25 from sticking to the mandrel 21. As is well known in the art, a lubricant such as 5% mineral oil (not shown) may be applied to the inner surface of the inner strip 23 prior to winding on the mandrel 21, and in the described embodiment such a lubricant may assist in preventing the adhesive layer 25 from sticking to the mandrel 21. A purpose for the perforation is to lower the total weight of strip material employed in making the laminated roller. Strip material such as polypropylene strips as may be advantageously used in connection with the present invention is generally sold by weight, and thus lowering the weight of strip material may reduce the overall cost of the laminated paint roller. As discussed in more detail in co-pending U.S. patent application Ser. No. 12/200,734, it has been found that the use of perforated strip material generally does not increase the amount of polypropylene resin required to form a laminated paint roller, and in some cases actually permits the use of less polypropylene resin, thereby further reducing the cost of manufacturing a laminated polypropylene roller.

After the application of the adhesive layer, composite cover material 817 is wrapped about the mandrel, over the perforated inner strip 923 and the adhesive layer 925. Thereafter, but prior to the hardening and setting of the adhesive material 25, a compressive force applies pressure to the outer surface of the composite cover material 817, imparting inward forces on the component parts, and laminating the composite cover material 817 and the perforated inner strip 923 as the adhesive layer 25 sets. The continuous roller 929 is thereby formed about the mandrel 21. The continuous roller 929 can be cut to usable lengths 926 by fly-away saw 27.

It is further within the scope of the present invention, although not diagrammatically represented, to make laminated paint rollers on the apparatus 900 using the perforated inner strip 923 and composite cover material 17b (see FIG. 6). Such combinations may further lower the total weight of sheet material used in, and thus the total price of, paint roller production.

In an embodiment, the inner strip 923 can be perforated by the use of an in-line rotary die (not shown) as the material moves to the Mandrel 21. Alternatively, the inner strip 923 can be perforated in a separate process prior to manufacture of the laminated paint roller, or the inner strip 923 can be purchased pre-perforated.

Figure 10:
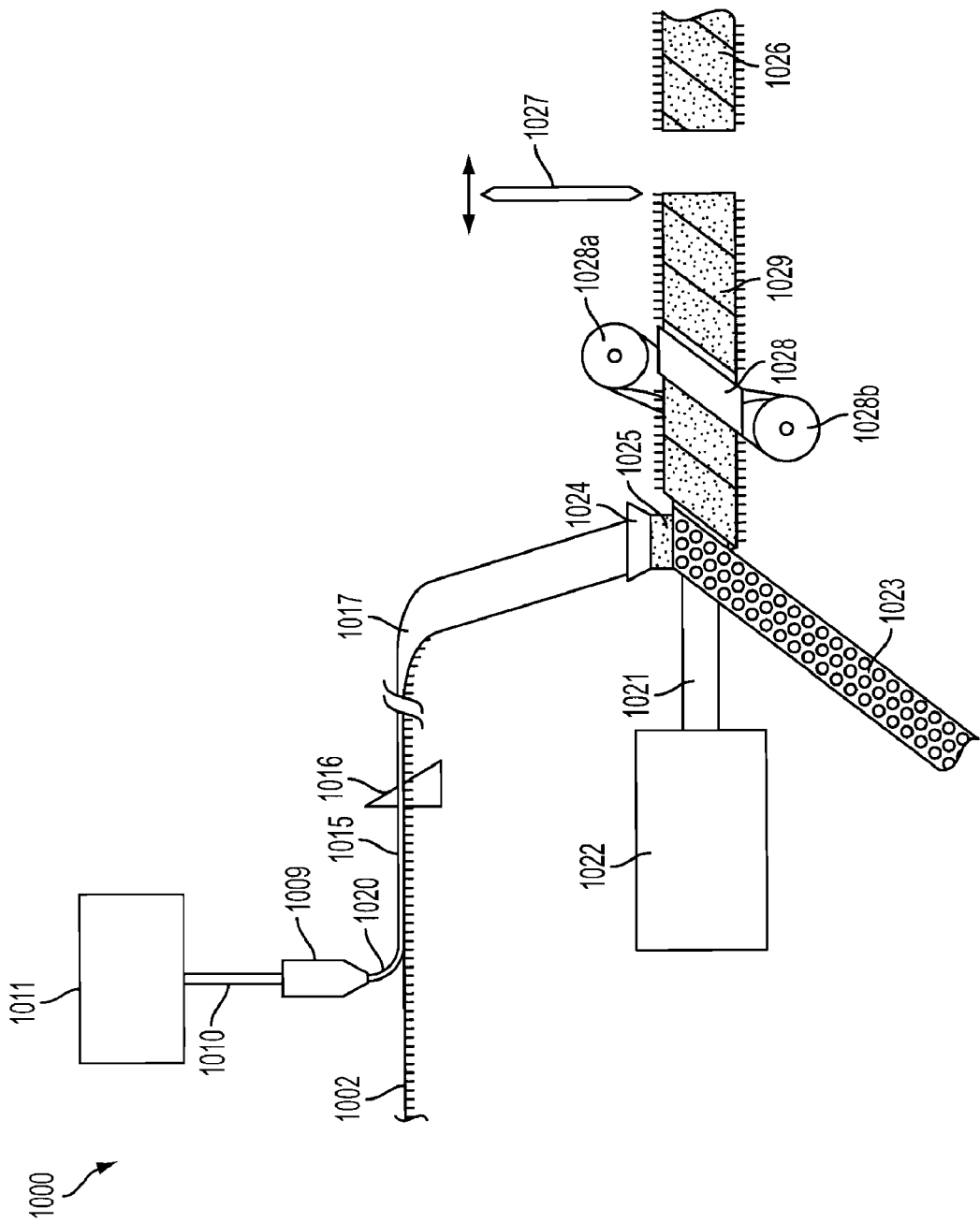
FIG. 10 is a diagrammatic representation of an apparatus suitable for making laminated paint rollers in accordance with an embodiment of the invention.

Turning now to FIG. 10, a diagrammatic representation of an apparatus suitable for making laminated paint rollers in accordance with an embodiment of the invention is shown. In an embodiment, the apparatus comprises an adhesive applicator 1009, a feeder 1010, an adhesive supply 1011 and cutters 1016. The composite cover material 1017 is formed using a continuous supply of pile material 1002 such as would be suitable for use manufacturing a paint roller cover. The pile material 1002 is laid flat for processing. Such material 1002 is usually sheared (not shown) on the pile side to attain a desired pile height prior to processing by the machine 1000. The material 1002 can be in any convenient width. In an embodiment, material 1002 has a width of approximately 32".

In an embodiment, an adhesive layer 1020 is applied to the non-pile side of the material 1002 by the adhesive applicator 1009. The adhesive supply 1011 supplies the adhesive to the applicator 1009 by a feeder 1010. In an embodiment, the adhesive is made predominantly or entirely from polypropylene resin, the adhesive applicator may be an extruder to extrude polypropylene resin, the extruder comprising a die head 1009 and the supply 1011 and feeder 1010.

After the adhesive layer 1020 is applied to the non-pile side of the material 1002, it is allowed to cool and set. Such cooling and setting can be hastened by a cooling system (not shown) which can impart cooling to the combined material 1015 by any method, including, without limitation, a cooled roller or the flow of cool air or other gas or fluids. In an embodiment, the adhesive layer 1020 comprises predominantly or entirely polypropylene. The fibers in the material 1002 are further held in place by the adhesive layer 1020 as it cools and sets.

Either before or after the applied adhesive layer 1020 is completely set, the combined material 1015 is advanced toward a cutter 1016. The cutter 1016 is used to cut the combined material into strips of composite cover material 1017 having a pile side and a side predominantly or entirely made of polypropylene. In an embodiment, the strips of composite cover material are each approximately 2⅞ inches wide, corresponding to a width of cover material that may typically be used to manufacture paint rollers.

To manufacture eleven strips of composite cover material 1017 each being 2⅞ inches wide, the pile material 2 should having a width of approximately 32". This width allows for a relatively small amount of waste on each side of the combined material 1015 as is cut by the cutter 1016 and thereby becomes composite cover material 1017.

Although the combined cover material 1015, or the strips of composite cover material 1017 can be spooled and cut (not shown) for transportation to another site or another machine performing a continuous manufacturing process for laminated paint rollers, in an embodiment, the composite cover material 1017 is fed directly to a mandrel 1021. Housing 1022 supports mandrel 1021. As is known in the art, a cooler (not shown) can be used to cool the mandrel 1021. An inner strip 1023 is feed about a the mandrel 1021, so it winds helically. In an embodiment, the inner strip is perforated polypropylene.

The head 1024 provides a second layer of adhesive material 1024 from a source of such material (not shown) delivered to the head 1024. The adhesive material 1024 is preferably polypropylene. The polypropylene material is preferably supplied an extruder (not shown). The head 1024 may be any type of head appropriate for providing adhesive material 1025 from the source, such as a nozzle or, where an extruder is used, a die.

In an embodiment a single head 1024 supplies an adhesive layer 1025 to the outer surface of inner strip 1023 as it rotates around the mandrel 1021. Although the width of the adhesive layer may be varied, in an embodiment, the width the adhesive layer 1025 should substantially cover the outer surface of the inner strip 1021. The width of the adhesive layer 1025, however, may not completely cover the outer surface of the inner strip 1021, or may be sufficient to provide excess adhesive over the amount required to completely cover the outer surface of inner strip 1021. The strip of composite cover material 1017 is advanced from the cutter 1016 about the mandrel 1021 outside of the inner strip 1023 and adhesive layer 1025.

The edges of the composite cover material 1017 may be offset from the edges of the inner strip 1023 as the two are advanced along the mandrel 1021. It is believed that the a stronger product is yielded from having an offset between the edge of the composite cover material 1017 and the edge of the inner strip 1023. An offset of between about one-quarter (as shown) and three-quarters of the width of the inner strip 1023 is found to achieve acceptable results. The best results are presently believed to be achieved by having an offset of about one-half of the width of the inner strip 1023.

Prior to the hardening and setting of the adhesive material 1025, an inwardly compressive force applies pressure to the outer surface of the composite cover material 1017, imparting inward forces on the component parts, thus laminating the composite cover material 1017 and the inner strip 1021 as the adhesive layer 1025 sets. The continuous roller 1029 is thereby formed about the mandrel 1021.

In an embodiment, the inwardly compressive force is a helical belt system formed from rollers 1028a, 1028b, and a belt 1028. In addition to compressing the component parts and forming the roller, the belt 1028 advances the thus-formed endless roller 1029 along the mandrel 1021 and continuously rotates the endless roller, thereby also advancing the inner strip 1023 and the composite cover material 1017 around and downstream on the mandrel 1017.

As is known in the art, the endless roller 1029 may be cut by the fly-away saw 1027, into lengths after it has sufficiently set. The fly-away saw 1027 may be used to cut endless roller 1029 into paint-roller sized lengths ready for finishing, or more typically into sticks 1026 of a fixed length, such as 65", that may be further cut and finished into paint-rollers.

Although many variations are possible, in an embodiment using a perforated inner strip 1023 made predominantly or entirely from polypropylene, the inventor has found that generally round, relatively small perforations, such as perforations of approximately ⅛ inch perform adequately to permit the prevent the adhesive layer 1025 from having excessive contact with, or imparting excessive heat to, the mandrel 1021. As is known in the art, a cooler (not shown) can be used to cool the mandrel 1021, and in the described embodiment may assist in preventing the adhesive layer 1025 from sticking to the mandrel 1021. As is well known in the art, a lubricant such as 5% mineral oil may be applied to the inner surface of the inner strip 1023 prior to winding on the mandrel 1021, and in the described embodiment may assist in preventing the adhesive layer 1020 from sticking to the mandrel 1021.

One purpose for the perforation is to use a lower total weight of polypropylene strip material because material such as polypropylene strip material, as may be advantageously used in connection with the present invention, is generally sold by weight.

The inner strip 1023 can be perforated by the use of an in-line rotary die (not shown) as the material moves to the mandrel 1021. Alternatively, the thermoplastic (e.g., polypropylene) strips can be perforated in a separate process prior to manufacture of the laminated paint roller, or the strips can be purchased pre-perforated.

It is within the scope of the invention to apply the adhesive layer 1025 to the outer surface of the inner strip 1023, the inner surface of the composite cover material 1017, or simultaneously to the inner surface of the composite cover material 1017 and the outer surface of the inner strip 1023, in any event, such that the adhesive layer 1025 is sandwiched between the inner strip 1023 and the composite cover material 1017.

In an embodiment, the head 1024 is a die head, and the adhesive layer 1025 is made predominantly or entirely from thermoplastic. An extruder (not shown) forces the thermoplastic through the head 1024, thereby applying liquefied thermoplastic as the adhesive layer 1025. In an embodiment, the thermoplastic is predominantly, or entirely, polypropylene.

A benefit of the instant invention is that a high quality laminated roller can be produced using a narrow head and two strip-type supplies, namely, a single strip of thermoplastic, e.g., polypropylene, and a composite cover material, e.g., with a polypropylene backing. It is expected that such a simplified process will be easier and more cost efficient to operate, and will likely be able to produce rollers faster than multi-strip lamination processes. Another benefit of the present invention is that it can create a paint roller using a narrow head and only two strip-type supplies without the well known defect present in such rollers that manifests itself as a weak point, often sticking out from the ends of a cut roller.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention, and has disclosed the ways the inventor now believes are the best ways to practice the invention. The most obvious variations to the present invention include variation in the size and shape of the groove and variations in the pattern and placement of the grooves. It is understood that the above description and drawings are merely illustrative of the present invention and that changes in components, structure and procedure are possible without departing from the scope of the present invention as defined in the following claims.

What is claimed is:

1. A method of making a laminated paint roller comprising the steps of:
advancing a perforated strip of thermoplastic material, the perforated strip having an inner surface, an outer surface, and holes there-through, the holes being perforated entirely through the strip;
applying a lubricant to the inner surface of the advancing perforated strip of thermoplastic material;
helically winding the lubricated, perforated strip of thermoplastic material around a cooled mandrel so as to form a helically wound strip wherein the inner surface of the perforated strip faces the cooled mandrel and the outer surface of the perforated strip faces away from the cooled mandrel;
advancing the wound perforated strip along the cooled mandrel;
applying a layer of adhesive onto an outer surface of the wound perforated strip; and
helically wrapping a strip of composite cover material about the wound strip and over the layer of adhesive, the composite cover material having an inner surface and an outer surface, the outer surface of the composite cover material comprising a pile fabric, and the inner surface of the composite cover material comprising thermoplastic; and applying a compressive force upon the composite cover material to urge the composite cover material, the layer of adhesive and strip of thermoplastic material together against the cooled mandrel, thereby laminating the inner surface of the composite cover material to the outer surface of the strip.

2. The method of making a laminated paint roller as claimed in claim 1, wherein the perforated strip of thermoplastic material substantially entirely consists of polypropylene.

3. The method of making a laminated paint roller as claimed in claim 1, wherein the inner surface of the composite cover material substantially entirely consists of polypropylene.

4. The method of making a laminated paint roller as claimed in claim 2, wherein the inner surface of the composite cover material and the layer of adhesive substantially entirely consist of polypropylene.

5. The method of making a laminated paint roller as claimed in claim 4, wherein the lubricant comprises mineral oil.

6. The method of making a laminated paint roller as claimed in claim 1, further comprising:

perforating a solid strip of thermoplastic material to make holes there-through.

* * * * *